(12) United States Patent
Salomon et al.

(10) Patent No.: US 11,907,267 B2
(45) Date of Patent: Feb. 20, 2024

(54) USER INTERFACE FOR FREQUENT PATTERN ANALYSIS

(71) Applicant: Salesforce, Inc., San Francisco, CA (US)

(72) Inventors: Yacov Salomon, Danville, CA (US); Kexin Xie, San Mateo, CA (US); Wanderley Liu, Sunnyvale, CA (US); Nathan Irace Burke, Brooklyn, NY (US); David Yourdon, Oakland, CA (US)

(73) Assignee: Salesforce Inc., San Francisco, CA (US)

( * ) Notice: Subject to any disclaimer, the term of this patent is extended or adjusted under 35 U.S.C. 154(b) by 209 days.

(21) Appl. No.: 16/119,951

(22) Filed: Aug. 31, 2018

(65) Prior Publication Data

US 2019/0362018 A1   Nov. 28, 2019

Related U.S. Application Data

(60) Provisional application No. 62/676,523, filed on May 25, 2018.

(51) Int. Cl.
| | | |
|---|---|---|
| *G06F 16/28* | (2019.01) | |
| *G06F 9/451* | (2018.01) | |
| *G06F 3/0481* | (2022.01) | |
| *G06F 16/26* | (2019.01) | |
| *G06F 16/901* | (2019.01) | |

(52) U.S. Cl.
CPC .......... *G06F 16/287* (2019.01); *G06F 3/0481* (2013.01); *G06F 9/451* (2018.02); *G06F 16/26* (2019.01); *G06F 16/9024* (2019.01)

(58) Field of Classification Search
CPC ...... G06F 16/287; G06F 16/26; G06F 3/0481; G06F 9/451; G06F 16/9024; G06F 16/2465; G06F 16/9038
See application file for complete search history.

(56) References Cited

U.S. PATENT DOCUMENTS

| | | | | |
|---|---|---|---|---|
| 2003/0028531 | A1* | 2/2003 | Han | G06F 16/2465 707/999.102 |
| 2003/0128212 | A1* | 7/2003 | Pitkow | G06T 11/206 345/440 |
| 2014/0143249 | A1* | 5/2014 | Cazzanti | G06F 16/26 707/737 |
| 2015/0373132 | A1* | 12/2015 | Mukherji | H04L 67/10 709/203 |

(Continued)

*Primary Examiner* — Mariela Reyes
*Assistant Examiner* — Fernando M Mari Valcarcel
(74) *Attorney, Agent, or Firm* — Holland & Hart LLP

(57) ABSTRACT

Methods, systems, and devices for displaying a user interface for frequent pattern (FP) analysis are described. In some cases, data stored at a multi-tenant database server may be analyzed to understand various interactions and patterns between data attributes associated with multiple users, or determine one or more attributes associated with a characterization of an individual (e.g., a persona). The multi-tenant database server may effectively cluster and/or perform calculations on attributes of the data to understand user patterns and determine common personas. The results may then be displayed by a user interface at a user device (e.g., associated with the user).

20 Claims, 13 Drawing Sheets

(56) References Cited

U.S. PATENT DOCUMENTS

| | | | |
|---|---|---|---|
| 2016/0103559 A1* | 4/2016 | Maheshwari | G06F 3/0481 |
| | | | 715/738 |
| 2016/0189183 A1* | 6/2016 | Km | G06F 16/287 |
| | | | 705/7.33 |
| 2017/0161337 A1* | 6/2017 | Yao | G06F 16/248 |
| 2017/0213241 A1* | 7/2017 | Zhou | G06Q 30/0201 |
| 2018/0052905 A1* | 2/2018 | Zhicharevich | G06F 16/2272 |
| 2018/0053207 A1* | 2/2018 | Modani | G06Q 30/0244 |
| 2018/0096417 A1* | 4/2018 | Cook | G06N 5/01 |

* cited by examiner

USER INTERFACE FOR FREQUENT PATTERN ANALYSIS

CROSS REFERENCES

The present Application for Patent claims priority to U.S. Provisional Patent Application No. 62/676,523 by Salomon et al., entitled "User Interface For Frequent Pattern Analysis," filed May 25, 2018, which is assigned to the assignee hereof and expressly incorporated by reference herein.

FIELD OF TECHNOLOGY

The present disclosure relates generally to database systems and data processing, and more specifically to a user interface for frequent pattern (FP) analysis.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may receive data from a wide variety of customer devices. The data may include, for example, browser data, application data, usage data, and the like. Due to the large amount and wide variety of data received by the cloud platform, determining patterns and correlations between various data sets may be both difficult and time consuming due to large amounts of extraneous data associated with any one user. Additionally, due to the large amounts of data, and the difficulty in determining patterns and correlations between various data sets, users may often be exposed to portions of the extraneous data or unmeaningful results of the analysis. Accordingly, techniques are desired for determining patterns and correlations between various data sets and efficiently displaying the results to a user.

DETAILED DESCRIPTION

Figure 1:
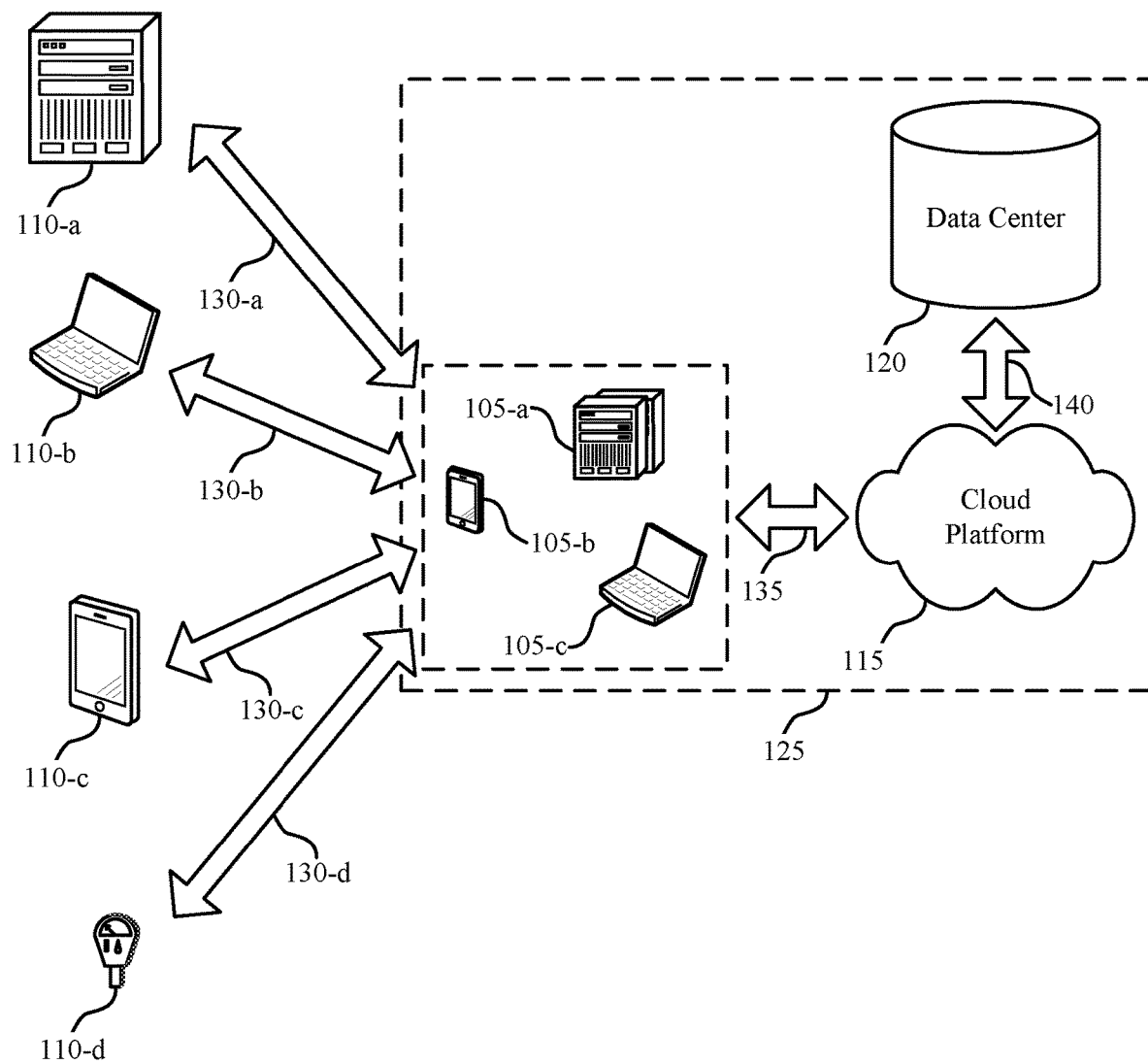
FIG. 1 illustrates an example of a system for displaying a user interface for FP analysis in accordance with aspects of the present disclosure.

In some database systems, a cloud platform may determine patterns and correlations between various data sets and efficiently display the results to a user. The cloud platform may utilize a multi-tenant database system (e.g., multiple users), where each user may in turn support multiple tenants. Data may be gathered from various users of the multi-tenant database system and may include, for example, browser data, application data, usage data, and the like. Upon gathering the data, the cloud platform may perform FP analysis on the data to determine patterns and correlations between data associated with multiple users (e.g., to understand the interaction between various attributes of the data), or may determine one or more personas (e.g., a characterization of an individual) based on various attributes of the data. In either instance, the cloud platform may effectively decipher and analyze a plurality of data acquired from a plurality of users. The cloud platform may then determine certain attributes associated with the data in order to determine results that are meaningful to a user and subsequently display the results to a user via a user interface.

In some examples, a user interface may display the results of Segmentation FP analysis. Segmentation FP analysis may be based on a variety of data associated with a plurality of users. For example, a user may wish to determine top characteristics (e.g., personas) of individuals who are pet owners. Accordingly, a user may enter (e.g., select) the desired persona type by interacting with a user device, and the Segmentation FP analysis may be conducted accordingly. In some examples, the analysis may include comparing every combination of attributes associated with users identified as pet owners. Subsequently, a listing of "most common" attributes may be developed and ultimately displayed to a user in a manner that is quick to decipher and easily understandable.

In other examples, a user interface may display the results of Journey FP analysis. Journey FP analysis, like Segmentation FP analysis, may be based on a variety of data associated with a plurality of users. For example, a user may wish to determine attributes in common to individuals who purchased a ticket to a particular movie. Accordingly, a user may enter (e.g., select) the desired resulting data attribute (e.g., users who purchased a ticket to a particular movie) by interacting with a user device. The Journey FP analysis may be conducted accordingly. In some examples, the analysis may include determining patterns and correlations between various data sets by using probabilistic calculations. Subsequently, a listing of "most common" attributes may be developed and ultimately displayed to a user in a manner that is quick to decipher and easily understandable.

Aspects of the disclosure are initially described in the context of an environment supporting an on-demand database service. Additionally, aspects of the disclosure are described through examples of data processing workflow platforms, a multiple user multi-tenant system, and example user interfaces. Aspects of the disclosure are further illustrated by and described with reference to apparatus diagrams, system diagrams, and flowcharts that relate to a user interface for FP analysis.

FIG. 1 illustrates an example of a system 100 for cloud computing that supports a user interface for FP analysis in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud client 105 may modify data for display in a user interface (e.g., a user interface of cloud client 105-c). For example, data center 120 may include a plurality of data objects received from a plurality of cloud clients 105. The data objects may each include a set of data attribute patterns that have been determined based on a FP analysis of the data set. In some examples, the data attribute patterns may be received by a cloud client 105 from data center 120 (e.g., over network connection 135). After receiving the data attribute patterns, the cloud client 105 may cluster the set of data attribute patterns into a set of data attribute pattern groups. Stated another way, the clustering may occur based on a desired number of data objects common to one data attribute pattern.

In some examples, a cloud client 105 may subsequently determine a subset of data attribute pattern groups of the set for display. The determination may be made based on a level of data object coverage of the subset of data attribute pattern groups and a level of data attribute coverage of the subset of data attribute pattern groups. As described above, clustering may occur based on a desired number of data objects common to one data attribute pattern, therefore the subset of data attribute pattern groups may include a select number of data attribute pattern groups based on a level of coverage of the group. In some examples, the subset of data attribute pattern groups may be displayed at a user interface of the cloud client 105.

In order to reduce the complexity of the data stored at data center 120 and effectively display results of the FP analysis (e.g., at cloud client 105), the cloud platform 115 may cluster the data based on a pattern association factor and a number of data objects common between the data attribute patterns of the data attribute pattern groups. As such, the cloud platform 115 may determine the frequency and/or recentness of each data attribute. For example, the cloud platform 115 may only analyze data that is within a certain threshold of frequency and/or recentness (e.g., data accessed X-times;

data accessed within Y-days). Accordingly, in performing the FP analysis, the cloud platform 115 may determine a subset of data attribute pattern groups having meaningful density. Accordingly, when displayed, the subset of data attribute pattern groups determined based on the FP analysis may be most-relevant to the user.

In other examples, a cloud client 105 may support FP analysis at a database system. For example, data center 120 may include a plurality of data objects received from a plurality of cloud clients 105. The data objects may each include a set of data attribute patterns that have been determined based on a FP analysis of the data set. In some examples, the data attribute patterns may be received by a cloud client 105 based on the data center 120 conducting a FP analysis on the data set. After receiving the data attribute patterns, the cloud client 105 may identify a resulting data attribute for analysis (e.g., for further analysis).

Upon identifying the resulting data attribute, the cloud client 105 may determine a set of input data attributes corresponding to the resulting data attribute for analysis. For example the set of input data attributes may be selected by a user of the cloud client 105. Based on the user input, the cloud client 105 may calculate a probability change using a data attribute pattern. Stated another way, cloud client 105 may calculate the probability of an end result—using the user-defined input—based on the resulting data attribute. In some examples, the cloud client may then display the determined set of input data attributes and the calculated probability change.

Similar to the process described above, in order to reduce the complexity of the data stored at data center 120 and effectively display results of the FP analysis (e.g., at cloud client 105), the cloud platform 115 may calculate a probability change corresponding to a difference between a probability that the resulting data attribute is in a data attribute pattern comprising the set of input data attributes and a probability that the resulting data attribute is in a data attribute pattern not comprising the set of input data attributes. As such, the cloud platform 115 may effectively determine a relevant set of data attribute patterns that relate to the identified resulting data attribute. Accordingly, in performing the FP analysis, the cloud platform 115 may determine a relevant set of data attribute patterns having meaningful density. Accordingly, when displayed, the relevant set of data attribute patterns determined based on the FP analysis may be most-relevant to the user.

Figure 2:
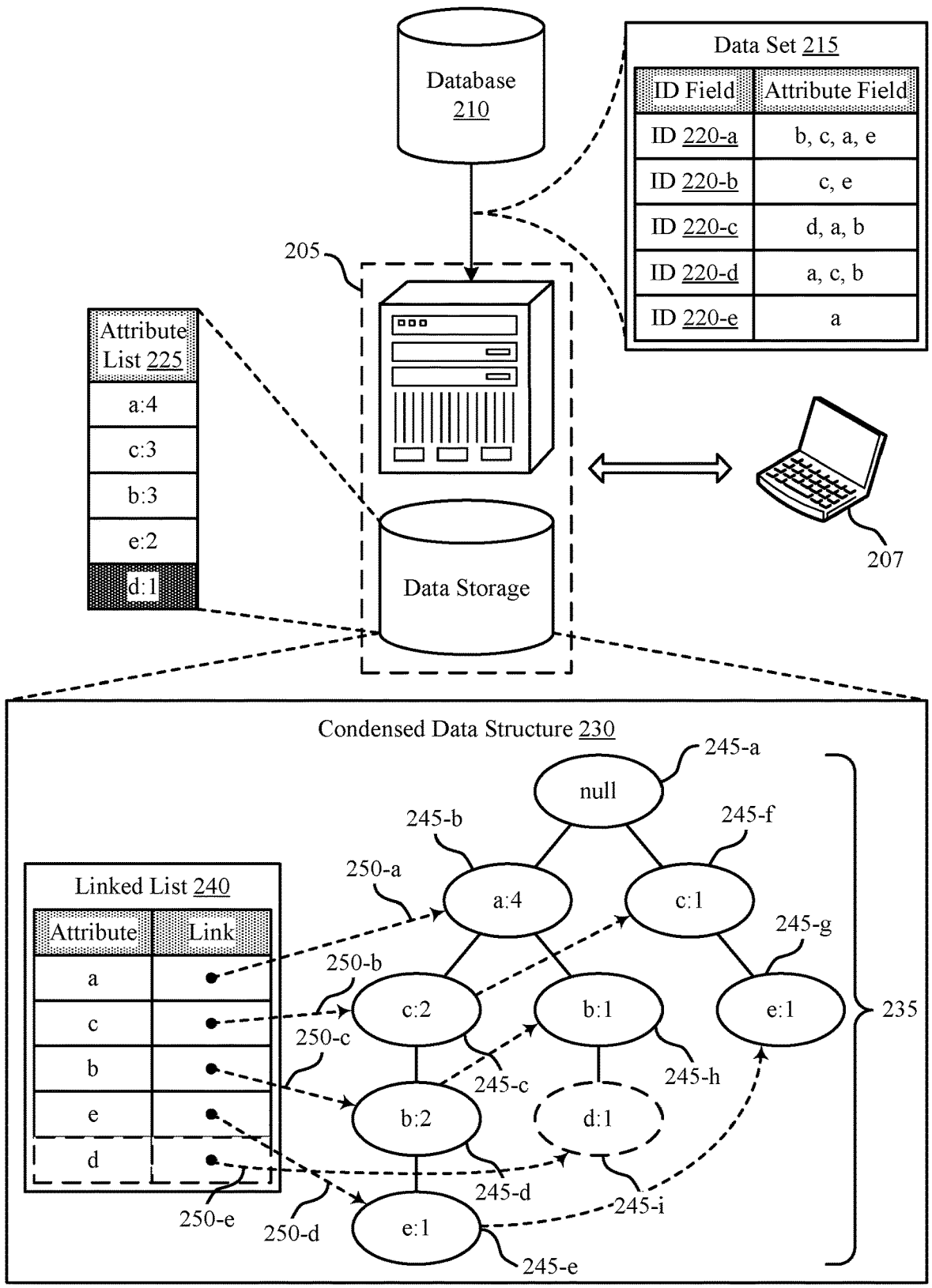
FIG. 2 illustrates an example of a database system implementing an FP analysis procedure in accordance with aspects of the present disclosure.

FIG. 2 illustrates an example of a database system 200 implementing an FP analysis procedure in accordance with aspects of the present disclosure. The database system 200 may be an example of a data center 120 as described with reference to FIG. 1, and may include a database 210 and a data processing machine 205. In some cases, the database 210 may be an example of a transactional database, a time-series database, a multi-tenant database, or some combination of these or other types of databases. The data processing machine 205 may be an example of a database server, an application server, a server cluster, a virtual machine, a container, or some combination of these or other hardware or software components supporting data processing for the database system 200. The data processing machine 205 may include a processing component and a local data storage component, where the local data storage component supports the memory resources of the data processing machine 205 and may be an example of a magnetic tape, magnetic disk, optical disc, flash memory, main memory (e.g., random-access memory (RAM)), memory cache, cloud storage system, or combination thereof. The data processing machine 205 may perform an FP analysis on a data set 215 (e.g., based on a user input command or automatically based on a configuration of the database system 200 or a supported FP-based application).

As described herein, the database system 200 may implement an FP-growth model for pattern mining that utilizes a condensed data structure 230. The condensed data structure 230 may include an FP-tree 235 and a linked list 240 linked to the nodes 245 of the FP-tree 235 via links 250. However, it is to be understood that the database system 200 may alternatively use other FP analysis techniques and data structures than those described. For example, the database system 200 may use a candidate set generation-and-test technique, a tree projection technique, or any combination of these or other FP analysis techniques. In other cases, the database system 200 may perform an FP analysis procedure similar to the one described herein but containing fewer, additional, or alternative processes to those described. The distribution processes described may be implemented with the FP-growth technique and the condensed data structure 230, or with any other FP analysis technique or data structure.

The data processing machine 205 may receive a data set 215 for processing. For example, the database 210 may transmit the data set 215 to the data processing machine 205 for FP analysis. The data set 215 may include multiple data objects, where each data object includes an identifier (ID) 220 and a set of data attributes. The data set 215 may include all data objects in the database 210, or may include data objects associated with a certain tenant (e.g., if the database 210 is a multi-tenant database), with a certain time period (e.g., if the attributes are associated with events or activities with corresponding timestamps), or with some other subset of data objects based on a user input value. For example, in some cases, a user operating a user device may select one or more parameters for the data set 215, and the user device may transmit the parameters to the database 210 (e.g., via a database or application server). The database 210 may transmit the data set 215 to the data processing machine 205 based on the received user input.

Each data object in the data set 215 may be identified based on an ID 220 and may be associated with one or more data attributes. These data attributes may be unique to that data object or may be common across multiple data objects. In some cases, an ID 220 may be an example of a text string unique to that data object. For example, if the data objects correspond to users in the database system 200, the IDs 220 may be user identification numbers, usernames, social security numbers, or some other similar form of ID where each value is unique to a user. The data attributes may be examples of activities performed by a data object (e.g., a user) or characteristics of the data object. For example, the data attributes may include information related to user devices operated by a user (e.g., internet protocol (IP) addresses, a total number of devices operated, etc.), information related to activities performed by the user while operating one of the user devices (e.g., web search histories, software application information, email communications, etc.), information related specifically to the user (e.g., information from a user profile, values or scores associated with the user, etc.), or a combination thereof. As illustrated in FIG. 2, these different data attributes may be represented by different letters (e.g., attributes {a}, {b}, {c}, {d}, and {e}).

In the exemplary case illustrated, the data set 215 may include five data objects. The first data object with ID 220-a may include data attributes {b, c, a, e}, the second data object with ID 220-b may include data attributes {c, e}, the third data object with ID 220-*c* may include data attributes {d, a, b}, the fourth data object with ID 220-*d* may include data attributes {a, c, b}, and the fifth data object with ID 220-*e* may include data attribute {a}. In one example, each data object may correspond to a different user or user device, and each data attribute may correspond to an activity or activity parameter performed by the user or user device. For example, attribute {a} may correspond to a user making a particular purchase online, while attribute {b} may correspond to a user visiting a particular website in a web browser of a user device. These data attributes may be binary values (e.g., Booleans) related to characteristics of a user.

The data processing machine 205 may receive the data set 215, and may construct a condensed data structure 230 based on the data set 215. The construction process may involve two passes through the data set 215, where the data processing machine 205 processes the data attributes for each data object in the data set 215 during each pass. In a first pass through the data set 215, the data processing machine 205 may generate an attribute list 225. The attribute list 225 may include the data attributes contained in the data set 215, along with their corresponding supports (i.e., occurrence frequencies within the data set 215). In some cases, during this first pass, the data processing machine 205 may filter out one or more attributes based on the supports for the attributes and a minimum support threshold, $\xi$. In these cases, the resulting data attributes included in the attribute list 225 may be referred to as frequent items or frequent attributes. The data processing machine 205 may order the data attributes in the attribute list 225 in descending order of support. For example, as illustrated, data processing machine 205 may identify that attribute {a} occurs four times in the data set 215, attributes {c} and {b} occur three times, attribute {e} occurs two times, and attribute {d} occurs one time. If the minimum support threshold, $\xi$, is equal to two, the data processing machine 205 may remove {d} from the attribute list 225 (or otherwise not include {d} in the attribute list 225) because the support for attribute {d} is less than the minimum support threshold. In some cases, a user may specify the minimum support threshold, using input features of a user interface. The data processing machine 205 may store the attribute list 225 in memory (e.g., temporary memory or persistent memory).

In a second pass through the data set 215, the data processing machine 205 may generate the condensed data structure 230 for efficient FP mining, where the condensed data structure 230 includes an FP-tree 235 and a linked list 240. The data processing machine 205 may generate a root node 245-*a* for the FP-tree 235, and may label the root node 245-*a* with a "null" value. Then, for each data object in the data set 215, the data processing machine 205 may order the attribute fields according to the order of the attribute list 225 (e.g., in descending order of support) and may add or update a branch of the FP-tree 235. For example, the data processing machine 205 may order the data attributes for the first data object with ID 220-*a* in order of descending support {a, c, b, e}. As no child nodes 245 exist in the FP-tree 235, the data processing machine 205 may create new child nodes 245 representing this ordered set of data attributes. The node for the first attribute in the ordered set is created as a child node 245-*b* of the root node 245-*a*, the node for the second attribute is created as a further child node 245-*c* off of this child node 245-*b*, and so on. For example, the data processing machine may create node 245-*b* for attribute {a}, node 245-*c* for attribute {c}, node 245-*d* for attribute {b}, and node 245-*e* for attribute {e} based on the order of descending support. When creating a new node 245 in the FP-tree 235, the data processing machine 205 may additionally set the count for the node 245 to one (e.g., indicating the one instance of the data attribute represented by the node 245).

The data processing machine 205 may then process the second data object with ID 220-*b*. The data processing machine 205 may order the data attributes as {c, e} (e.g., based on the descending order of support as determined in the attribute list 225), and may check the FP-tree 235 for any nodes 245 stemming from the root node 245-*a* that correspond to this pattern. As the first data attribute of this ordered set is {c}, and the root node 245-*a* does not have a child node 245 for {c}, the data processing machine 205 may create a new child node 245-*f* from the root node 245-*a* for attribute {c} and with a count of one. Further, the data processing machine 205 may create a child node 245-*g* off of this {c} node 245-*f*, where node 245-*g* represents attribute {e} and is set with a count of one.

As a next step in the process, the data processing machine 205 may order the attributes for the data object with ID 220-*c* as {a, b, d} and may add this ordered set to the FP-tree 235. In some cases, if data attribute {d} does not have a significantly large enough support value (e.g., as compared to the minimum support threshold, the data processing machine 205 may ignore the {d} data attribute (and any other data attributes that are not classified as "frequent" attributes) in the list of attributes for the data object. In either case, the data processing machine 205 may check the FP-tree 235 for any nodes 245 stemming from the root node 245-*a* that correspond to this ordered set. Because child node 245-*b* for attribute {a} stems from the root node 245-*a*, and the first attribute in the ordered set for the data object with ID 220-*c* is {a}, the data processing machine 205 may determine to increment the count for node 245-*b* rather than create a new node 245. For example, the data processing machine 205 may change node 245-*b* to indicate attribute {a} with a count of two. As the only child node 245 off of node 245-*b* is child node 245-*c* for attribute {c}, and the next attribute in the ordered set for the data object with ID 220-*c* is attribute {b}, the data processing machine 205 may generate a new child node 245-*h* off of node 245-*b* that corresponds to attribute {b} and may assign the node 245-*h* a count of one. If attribute {d} is included in the attribute list 225, the data processing machine 205 may additionally create child node 245-*i* for {d}.

This process may continue for each data object in the data set 215. For example, in the case illustrated, the data object with ID 220-*d* may increment the counts for nodes 245-*b*, 245-*c*, and 245-*d*, and the data object with ID 220-*e* may increment the count for node 245-*b*. Once the attributes—or the frequent attributes, when implementing a minimum support threshold—from each data object in the data set 215 are represented in the FP-tree 235, the FP-tree 235 may be complete in memory of the data processing machine 205 (e.g., stored in local memory for efficient processing and FP mining, or stored externally for improved memory capacity). By generating the ordered attribute list 225 in the first pass through the data set 215, the data processing machine 205 may minimize the number of branches needed to represent the data, as the most frequent data attributes are included closest to the root node 245-*a*. This may support efficient storage of the FP-tree 235 in memory. Additionally, generating the attribute list 225 allows the data processing machine 205 to identify infrequent attributes and remove these infrequent attributes when creating the FP-tree 235 based on the data set 215.

In addition to the FP-tree 235, the condensed data structure 230 may include a linked list 240. The linked list 240 may include all of the attributes from the attribute list 225 (e.g., all of the attributes in the data set 215, or all of the frequent attributes in the data set 215), and each attribute may correspond to a link 250. Within the table, these links 250 may be examples of head of node-links, where the node links point to one or more nodes 245 of the FP-tree 235 in sequence or in parallel. For example, the entry in the linked list 240 for attribute {a} may be linked to each node 245 in the FP-tree 235 for attribute {a} via link 250-a (e.g., in this case, attribute {a} is linked to node 245-b). If there are multiple nodes 245 in the FP-tree 235 for a specific attribute, the nodes 245 may be linked in sequence. For example, attribute {c} of the linked list 240 may be linked to nodes 245-c and 245-f in sequence via link 250-b. Similarly, link 250-c may link attribute {b} of the linked list 240 to nodes 245-d and 245-h, link 250-d may link attribute {e} to nodes 245-e and 245-g, and—if frequent enough to be included in the attribute list 225—link 250-e may link attribute {d} to node 245-i.

In some cases, the data processing machine 205 may construct the linked list 240 following completion of the FP-tree 235. In other cases, the data processing machine 205 may construct the linked list 240 and the FP-tree 235 simultaneously, or may update the linked list 240 after adding each data object representation from the data set 215 to the FP-tree 235. The data processing machine 205 may also store the linked list 240 in memory along with the FP-tree 235. In some cases, the linked list 240 may be referred to as a header table (e.g., as the "head" of the node-links are located in this table). Together, these two structures form the condensed data structure 230 for efficient FP mining at the data processing machine 205. The condensed data structure 230 may contain all information relevant to FP mining from the data set 215 (e.g., for a minimum support threshold, $\xi$). In this way, transforming the data set 215 into the FP-tree 235 and corresponding linked list 240 may support complete and compact FP mining.

The data processing machine 205 may perform a pattern growth method, FP-growth, to efficiently mine FPs from the information compressed in the condensed data structure 230. In some cases, the data processing machine 205 may determine the complete set of FPs for the data set 215. In other cases, the data processing machine 205 may receive a data attribute of interest (e.g., based on a user input in a user interface), and may determine all patterns for that data attribute. In yet other cases, the data processing machine 205 may determine a single "most interesting" pattern for a data attribute or a data set 215. The "most interesting" pattern may correspond to the FP with the highest occurrence rate, the longest list of data attributes, or some combination of a high occurrence rate and long list of data attributes. For example, the "most interesting" pattern may correspond to the FP with a number of data attributes greater than an attribute threshold with the highest occurrence rate, or the "most interesting" pattern may be determined based on a formula or table indicating a tradeoff between occurrence rate and length of the attribute list.

To determine all of the patterns for a data attribute, the data processing machine 205 may start from the head of a link 250 and follow the node link 250 to each of the nodes 245 for that attribute. The FPs may be defined based on a minimum support threshold, which may be the same minimum support threshold as used to construct the condensed data structure 230. For example, if $\xi=2$, a pattern is only considered "frequent" if it appears two or more times in the data set 215. To identify the complete set of FPs for the data set 215, the data processing machine 205 may perform the mining procedure on the attributes in the linked list 240 in ascending order. As attribute {d} does not pass the minimum support threshold of $\xi=2$, the data processing machine 205 may initiate the FP-growth method with data attribute {e}.

To determine the FPs for data attribute {e}, the data processing machine 205 may follow link 250-d for attribute {e}, and may identify node 245-e and node 245-g both corresponding to attribute {e}. The data processing machine 205 may identify that data attribute {e} occurs two times in the FP-tree 235 (e.g., based on summing the count values for the identified nodes 245-e and 245-g), and thus has at least the simplest FP of (e:2) (i.e., a pattern including attribute {e} occurs twice in the data set 215). The data processing machine 205 may determine the paths to the identified nodes 245, {a, c, b, e} and {c, e}. Each of these paths occurs once in the FP-tree 235. For example, even though node 245-b for attribute {a} has a count of four, this attribute {a} appears together with attribute {e} only once (e.g., as indicated by the count of one for node 245-e). These identified patterns may indicate the path prefixes for attribute {e}, namely {a:1, c:1, b:1} and {c:1}. Together, these path prefixes may be referred to as the sub-pattern base or the conditional pattern base for data attribute {e}. Using the determined conditional pattern base, the data processing machine 205 may construct a conditional FP-tree for attribute {e}. That is, the data processing machine 205 may construct an FP-tree using similar techniques as those described above, where the FP-tree includes only the attribute combinations that include attribute {e}. Based on the minimum support threshold, $\xi$, and the identified path prefixes {a:1, c:1, b:1} and {c:1}, only data attribute {c} may pass the support check. Accordingly, the conditional FP-tree for data attribute {e} may contain a single branch, where the root node 245 has a single child node 245 for attribute {c} with a count of two (e.g., as both of the path prefixes include attribute {c}). Based on this conditional tree, the data processing machine 205 may derive the FP (ce:2). That is, the attributes {c} and {e} occur together twice in the data set 215, while attribute {e} does not occur at least two times in data set 215 with any other data attribute. For conditional FP-trees with greater than one child node 245, the data processing machine 205 may implement a recursive mining process to determine all eligible FPs that contain the attribute being examined. The data processing machine 205 may return the FPs (e:2) and (ce:2) for the data attribute {e}. In some cases, the data processing machine 205 may not count patterns that simply contain the data attribute being examined as FPs, and, in these cases, may just return (ce:2).

This FP-growth procedure may continue with attribute {b}, then attribute {c}, and conclude with attribute {a}. For each data attribute, the data processing machine 205 may construct a conditional FP-tree. Additionally, because the FP-growth procedure is performed in an ascending order through the linked list 240, the data processing machine 205 may ignore child nodes 245 of the linked nodes 245 when determining the FPs. For example, for attribute {b}, the link 250-c may indicate nodes 245-d and 245-h. When identifying the paths for {b}, the data processing machine 205 may not traverse the FP-tree 235 past the linked nodes 245-d or 245-h, as any patterns for the nodes 245 below this on the tree were already determined in a previous step. For example, the data processing machine 205 may ignore node 245-e when determining the patterns for node 245-d, as the patterns including node 245-e were previously derived. Based on the FP-growth procedure and these conditional FP-trees, the data processing machine 205 may identify additional FPs for the rest of the data attributes in the linked list 240. For example, using a recursive mining process and based on the minimum support threshold of ξ=2, the data processing machine 205 may determine the complete set of FPs: (e:2), (ce:2), (b:3), (cb:2), (ab:3), (acb:2), (c:3), (ac:2), and (a:4).

In some cases, the data processing machine 205 may store the resulting patterns locally in a local data storage component. Additionally or alternatively, the data processing machine 205 may transmit the patterns resulting from the FP analysis to the database 210 for storage or to a user device (e.g., for further processing or to display in a user interface). In some cases, the data processing machine 205 may determine a "most interesting" FP (e.g., (acb:2) based on the number of data attributes included in the pattern) and may transmit an indication of the "most interesting" FP to the user device. In other cases, the user device may transmit an indication of an attribute for examination (e.g., data attribute {c}), and the data processing machine 205 may return one or more of the FPs including data attribute {c} in response.

By transforming the data set 215 into the condensed data structure 230, the data processing machine 205 may avoid the need for generating and testing a large number of candidate patterns, which can be very costly in terms of processing and memory resources, as well as in terms of time. For very large database systems 200, databases 210, or data sets 215, the FP-tree 235 may be much smaller than the size of the data set 215, and the conditional FP-trees may be even smaller. For example, transforming a large data set 215 into an FP-tree 235 may shrink the data by a factor of approximately one hundred, and transforming the FP-tree 235 into a conditional FP-tree may again shrink the data by a factor of approximately one hundred, resulting in very condensed data structures 230 for FP mining.

Additionally or alternatively, the user device 207 may support additional methods for conducting FP analysis at the database system 200. For example, database 210 may include a data set 215 received from a plurality of user devices (e.g., from user device 207). The data set 215 may be associated with an attribute list 225 that may have been determined based on a FP analysis of the data set. After receiving the attribute list 225, the user device 207 may identify a resulting data attribute for analysis (e.g., for further analysis), and may determine a set of input data attributes corresponding to the resulting data attribute for analysis. Ultimately, the database system 200 may calculate a probability change corresponding to a difference between a probability that the resulting data attribute is in a data attribute pattern comprising the set of input data attributes and a probability that the resulting data attribute is in a data attribute pattern not comprising the set of input data attributes. As such, the database system 200 may effectively determine a relevant set of data attribute patterns that relate to the identified resulting data attribute. Accordingly, in performing the FP analysis, the database system 200 may determine a relevant set of data attribute patterns having meaningful density. Thus, when displayed (e.g., at the user device 207), the relevant set of data attribute patterns determined based on the FP analysis may be most-relevant to the user.

Figure 3:
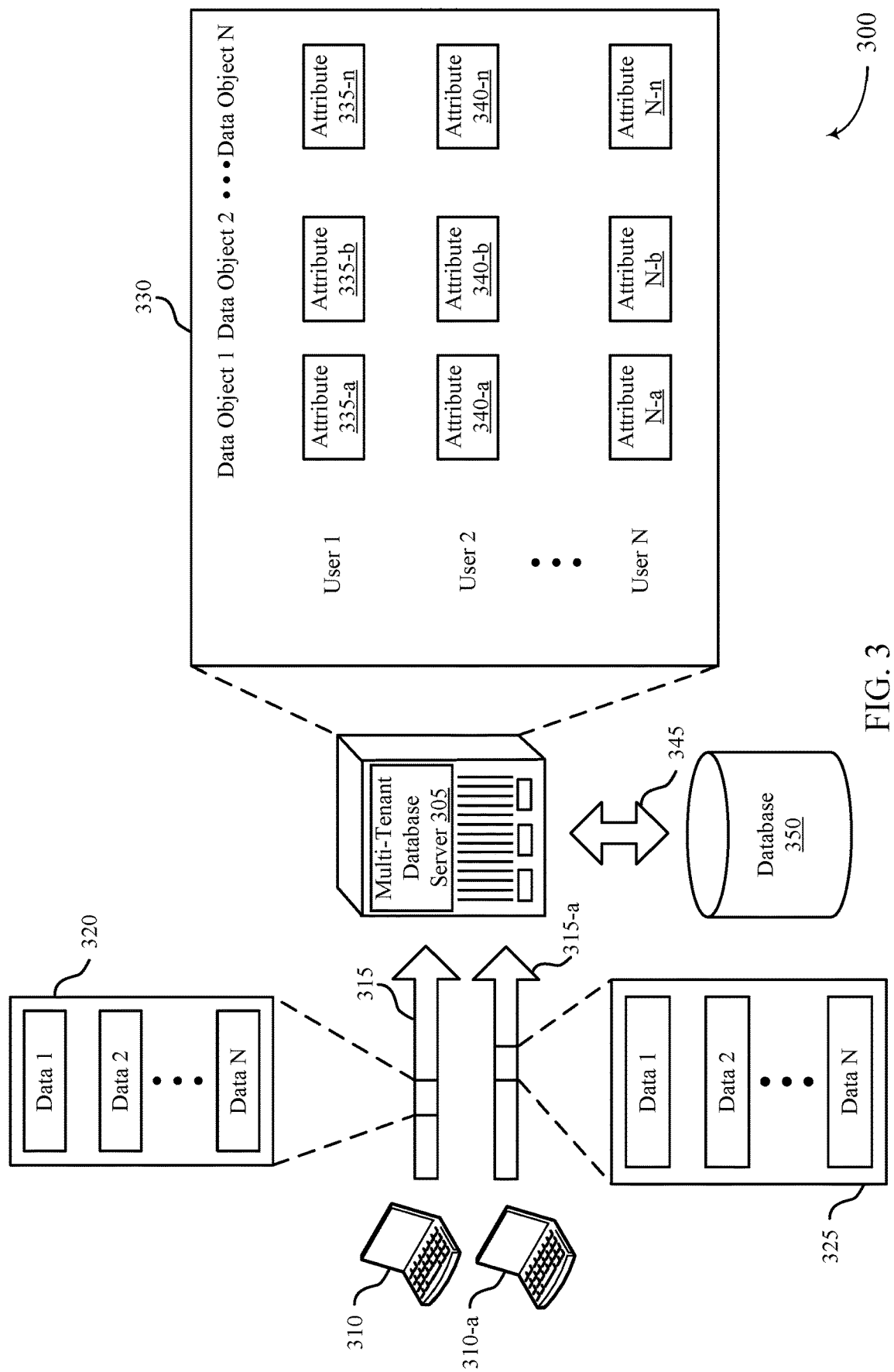
FIG. 3 illustrates an example of a data processing workflow platform that supports displaying a user interface for FP analysis in accordance with aspects of the present disclosure.

FIG. 3 illustrates an example of a data processing workflow platform 300 that supports displaying a user interface for FP analysis in accordance with various aspects of the present disclosure. Data processing workflow platform 300 may include a multi-tenant database server 305, users 310 and 310-a, where each user may correspond to a user device associated with the respective user. Each user may transmit a variety of data to the multi-tenant database server 305 over a respective interaction (e.g., over interaction 315 and interaction 315-a). For example, each user may transmit data that may include, for example, browser data, application data, usage data, and the like. In some cases, each user (e.g., user 310, user 310-a) may be an example of a cloud client 105 as described with reference to FIG. 1 and/or a user device 207 as described with reference to FIG. 2. Multi-tenant database server 305 may support multiple users, and each user may support multiple tenants.

In some cases, each user may transmit a variety of data to the multi-tenant database server 305. As described above, the data may include browser data, application data, usage data, and the like. The received data may be stored within table 330, and may be referred to as a data set. Within the data set, various data objects may exist. For example, browser data, application data, and usage data (e.g., of a user device) may each be or may each be referred to as an individual data object. Each individual data object may include a specific attribute or set of attributes associated with the object. An attribute of the data object may further-define or further-indicate a characteristic of the particular data object. A particular attribute (e.g., attribute 335-a) may be associated with a first user (e.g., user 310) and a first data object associated with the first user. For example, a first data object associated with a first user may be or may include information regarding a transaction where the user purchased shoes from an online retailer. In some examples, attribute 335-a may indicate that the shoes the user purchased were red. Table 330 may store a plurality of data objects and attributes associated with any one data object (e.g., Data Object N, Attribute 335-n). Additionally or alternatively, table 330 may store data objects and/or attributes associated with a plurality of users (e.g., User N).

In some examples, FP analysis may be performed on the data stored at table 330 (e.g., by the multi-tenant database server 305). The type of FP analysis performed may be based on a desired result of the analysis. For example, a user may wish to understand various interactions and patterns between data attributes associated with multiple users. This may be referred to as Journey FP analysis. As described above, the data stored in table 330 may be associated with real-life events of multiple users (e.g., users 310, 310-a). To understand the interactions and patterns between various data attributes, a user may first identify a resulting data attribute for analysis. Stated another way, a user may define an intended result based on the Journey FP analysis. For example, a user may wish to know what events (e.g., what data attributes) contributed to a user purchasing a particular movie ticket.

To conduct such an analysis, the multi-tenant database server 305 may look at a variety of attributes (e.g., attribute 335-a, 340-b) that contribute to the intended analysis. Using the movie ticket example described above, the multi-tenant database server 305 may thus identify the attributes associated with a user that signify the particular user purchased the movie ticket. Upon making this identification, the multi-tenant database server 305 may analyze a set of input data attributes (e.g., all other attributes associated with each user that purchased the ticket) and conduct a Journey FP analysis on the set of attributes.

In conducting the Journey FP analysis on the set of attributes, the multi-tenant database server 305 may calculate a probability change corresponding to a difference between a probability that the resulting data attribute is in a data attribute pattern comprising the set of input data attributes and a probability that the resulting data attribute is in a data attribute pattern not comprising the set of input data attributes. Stated another way, the multi-tenant database server 305 may determine, based on comparing various data attributes, the probability that any one attribute contributed to the user purchasing the particular ticket, and the probability that any one attribute did not contribute to the user purchasing the particular ticket. Based on this probabilistic analysis, the multi-tenant database server 305 may determine a set of attributes that contributed to the resulting data attribute (e.g., contributed to the user purchasing the ticket). The set of attributes may be displayed to the user (e.g., via user interface 610 as described with reference to FIG. 6).

In other examples, a different FP analysis may be performed on the data stored at table 330 (e.g., by the multi-tenant database server 305). For example, a user may wish to determine a persona, or personas, based on a variety of data associated with a plurality of users. A persona may be a characterization of an individual—e.g., not a living human—that may be indicative of a user's behaviors in a particular situation or circumstance, likes, or dislikes. For example, a user may wish to determine top personas associated with pet owners (e.g., attributes that define or are associated with pet owners). This analysis may be referred to as Segmentation FP analysis.

As described above, the data stored in table 330 may be associated with real-life events of multiple users (e.g., users 310, 310-*a*). To understand the attributes associated with a persona, a user may first identify a desired persona type. Stated another way, a user must define a characteristic associated with a persona in order for the multi-tenant database server 305 to analyze the data and determine a listing of attributes associated with each persona. For example, a user may wish to know what attributes are associated with pet owners.

To conduct such an analysis, the multi-tenant database server 305 may look at a variety of attributes (e.g., attribute 335-*a*, 340-*b*) that contribute to the intended analysis and use logic (e.g., Boolean logic) to determine relationships between certain attributes and, in effect, narrow the data set. Using the pet owner example described above, the multi-tenant database server 305 may thus identify users who are pet owners. Subsequently, the multi-tenant database server 305 may begin comparing various other attributes associated with the users identified as pet owners. For example, the multi-tenant database server 305 may analyze the frequency and recentness of the data to conduct a Segmentation FP analysis to determine the top associated personas.

In conducting the Segmentation FP analysis on the set of attributes, the multi-tenant database server 305 may cluster the set of data attribute patterns (e.g., attributes in common to all pet owners) into a set of data attribute pattern groups based at least in part on a pattern association factor and a number of data objects of the plurality of data objects common between data attribute patterns of the data attribute pattern groups. Stated another way, data that matches a frequency threshold (e.g., visited at least X-times) and a recentness threshold (e.g., visited with Y-days) may be grouped. In some examples, the pattern association factor (e.g., the frequency threshold and the recentness threshold) may be modified by a user (e.g., via the user interface).

After clustering the data attribute patterns, the multi-tenant database server 305 may determine a subset of data attribute pattern groups of the set of data attribute pattern groups for display. In some examples, the determination may be based on a level of data object coverage of the subset of data attribute pattern groups and a level of data attribute coverage of the subset of data attribute pattern groups. For example, a top number of data attribute pattern groups (e.g., the top 5 data attribute pattern groups) may ultimately be displayed. Based on the clustering and determination of a top number of groups (e.g., a top number of personas), the groups may be displayed to the user (e.g., via user interface 510 as described with reference to FIG. 5).

In some examples, multi-tenant database server 305 may communicate with a database 350 (e.g., over a network connection 345) to store, retrieve, process, or perform additional actions on data records corresponding to or owned by users 310, 310-*a*. In other cases, users 310, 310-*a* may define one or more additional data sets and/or data objects for use in a Journey FP analysis or Segmentation FP analysis. Multi-tenant database server 305 may receive the updated data and may conduct an updated analysis (e.g., a Journey or Segmentation FP analysis) and may update the results displayed to the user (e.g., via user interface 510 as described with reference to FIG. 5; via user interface 610 as described with reference to FIG. 6). For example, the multi-tenant database server 305 may update the displayed results in real-time.

Figure 4:
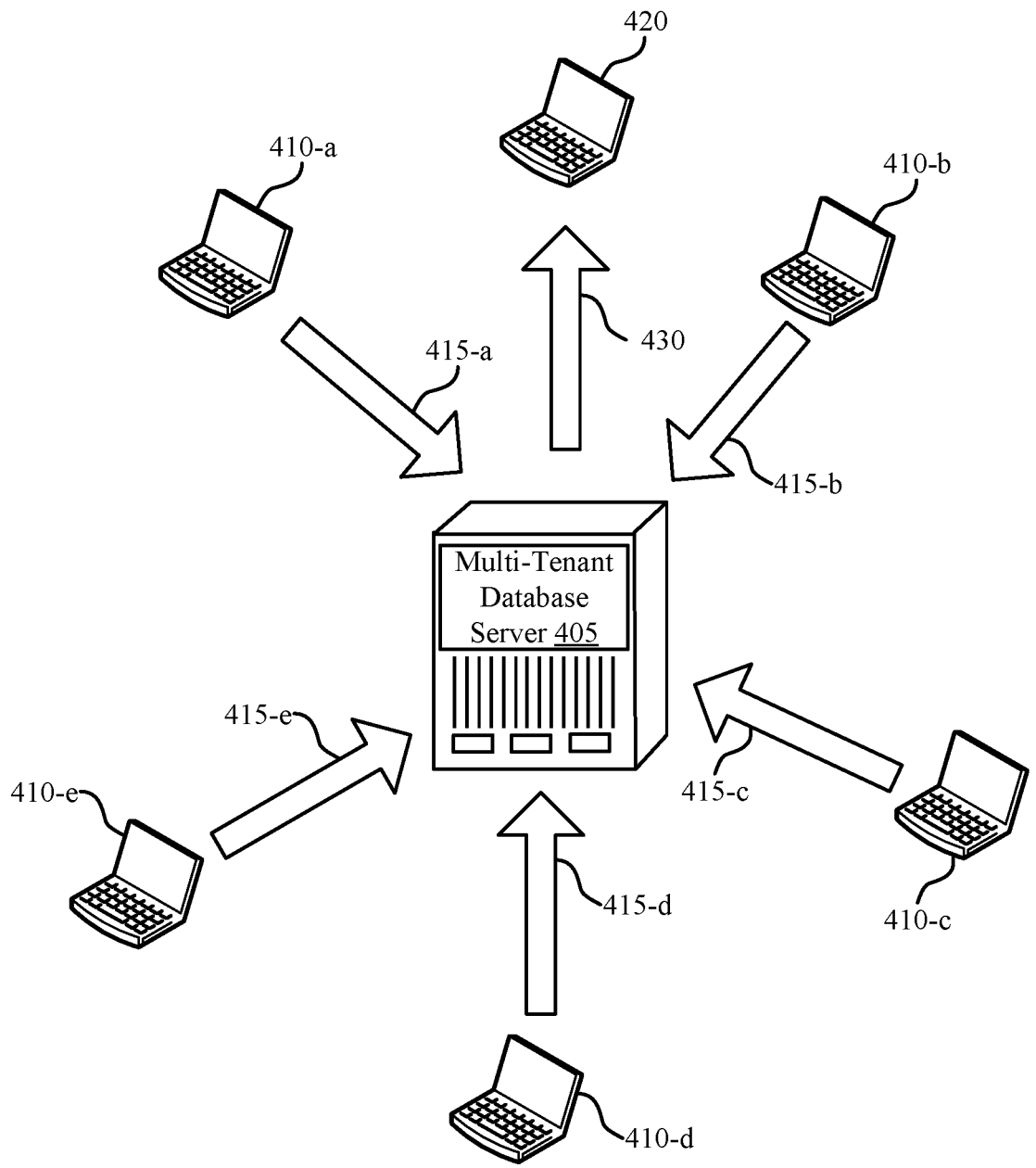
FIG. 4 illustrates an example of a multiple user multi-tenant system that supports displaying a user interface for FP analysis in accordance with aspects of the present disclosure.

FIG. 4 illustrates an example of a multiple user, multi-tenant system 400 that supports displaying a user interface for FP analysis in accordance with various aspects of the present disclosure. Multiple user, multi-tenant system 400 may include a multi-tenant database server 405 and multiple users 410, which may correspond to the multi-tenant database server 305 and users 310, 310-*a*, respectively, as described with reference to FIG. 3. Each user 410 may transmit data (e.g., browser data, application data, usage data, and the like) to multi-tenant database server 405 over respective interactions 415.

As described above, in some cases each user 410 may transmit one or more data sets to multi-tenant database server 405, which may conduct FP analysis on the data. Multi-tenant database server 405 may establish a user interface based on FP analysis conducted on the data, as described above with reference to FIG. 3. For example, the user interface may be displayed at user device 420 (e.g., via interaction 430) based on the analysis conducted. Multi-tenant database server 405 may serve multiple users 410 that each have multiple tenants, and may instantiate and execute tenant-specific batch processes for each defined configuration from each user 410. Each user may additionally provide various data sets (e.g., that include different data objects and/or different data attributes) to the multi-tenant database server 405. Based on the data received, the multi-tenant database server 405 may conduct a specific FP analysis on the data based on a request received from user device 420. For example, user device 420 may request a Journey FP analysis (e.g., as described with reference to FIG. 3) or a Segmentation FP analysis (e.g., as described with reference to FIG. 3) depending on the user's specific needs. As described below with references to FIGS. 5 and 6, the results of the respective FP analysis may be displayed to user device 420 in a manner based on the type of analysis performed.

In some examples, multi-tenant database server 405 may perform real-time FP analysis on data received from each user 410 and may update the user interface displayed to user device 420 accordingly. For example, a listing of personas displayed to user device 420 may be updated based on a new data attribute pattern received by one of users 410. Stated another way, multi-tenant database server 405 may receive updated data from one of users 410 and may update the clustering of the set of data attribute patterns. In turn, the multi-tenant database server 405 may re-determine a subset of data attribute pattern groups of the set of data attribute pattern groups for display and the user interface display may be updated accordingly.

Figure 5:
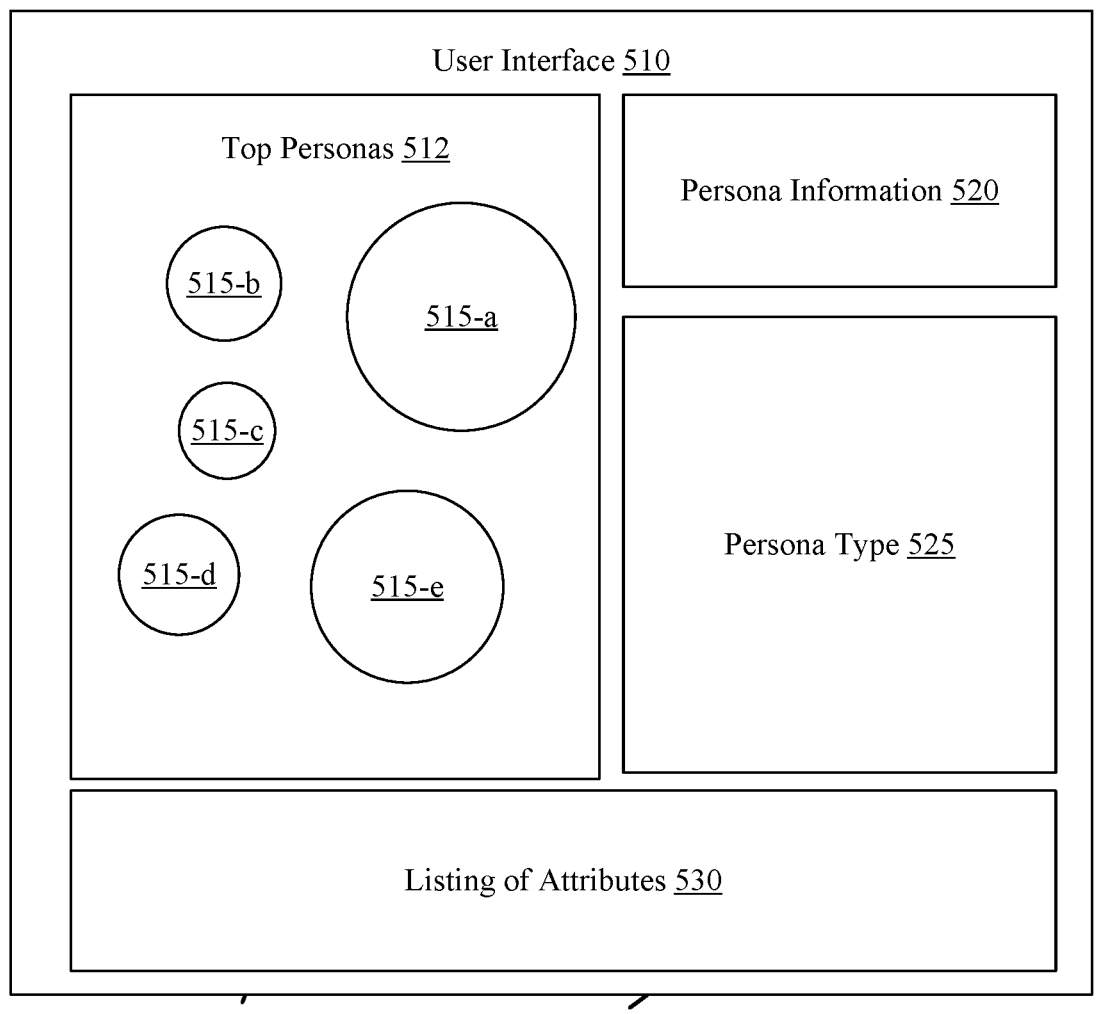
FIG. 5 illustrates an example of a user interface that supports FP analysis in accordance with aspects of the present disclosure.

FIG. 5 illustrates an example of a user device 505 that includes a user interface 510 that supports FP analysis in accordance with aspects of the present disclosure. User interface 510 may support Segmentation FP analysis, as described above, and may include a top personas display 512, a persona information display 520, a persona type display 525, and a listing of attributes 530. In some examples, top personas display 512 may include top personas 515-a, 515-b, 515-c, 515-d, and 515-e. Additionally or alternatively, persona type display 525 may also include a user input to select (e.g., to input) a desired characteristic for use in the Segmentation FP analysis. User interface 510 may be displayed on a user device 505, which may be an example of user device 420 as described with reference to FIG. 4, based on data received from a plurality of users (e.g., users 410 as described with reference to FIG. 4).

User interface 510 may support Segmentation FP analysis as described above with reference to FIG. 3. A user may wish to determine a persona (e.g., persona 515-a) based on a variety of data associated with a plurality of users. For example, a user may wish to determine top personas associated with pet owners (e.g., attributes that define or are associated with pet owners). Accordingly, a user may enter (e.g., select) the desired persona type by interacting with persona type display 525. In some examples, the user may select the desired persona type by making a selection via a prepopulated list (e.g., a dropdown menu) and, in other examples, the user may select the desired persona type by manually entering the persona type or an indication of the persona type.

After a user enters a desired persona type by interacting with persona type display 525, a Segmentation FP analysis may occur (e.g., at multi-tenant database server 305 as described with reference to FIG. 3; via multi-tenant database server 305 as described with reference to FIG. 3). As described above, the analysis may occur using logic (e.g., Boolean logic) to narrow the data set stored at the multi-tenant database server. In some examples, the logic may first identify any users that are known pet owners. Subsequently, various attributes associated with each user identified as a pet owner may be compared. Every combination of attributes between the users identified as pet owners may be compared. Accordingly, a listing of "most common" attributes may be developed, which may aid in the indication of the top personas displayed at top personas display 512.

As the listing of "most common" attributes are developed, the multi-tenant database server may cluster the set of data attribute patterns (e.g., attributes in common to all pet owners) into a set of data attribute pattern groups based at least in part on a pattern association factor and a number of data objects of the plurality of data objects common between data attribute patterns of the data attribute pattern groups. Stated another way, data that matches a frequency threshold (e.g., visited at least X-times) and a recentness threshold (e.g., visited with Y-days) may be grouped. In some examples, construction of the data attribute pattern groups may be based on the Kullback-Leibler (KL) divergence algorithm.

The top results may then be displayed at top personas display 512. In some examples, the number of top results may be user-defined (e.g., via user input at persona type display 525). In other examples, the number of top results may be predefined (e.g., the top 5 results are displayed) or may be determined using a standard deviation calculation.

As shown in the top personas display 512 of FIG. 5, five top personas (e.g., personas 515-a, 515-b, 515-c, 515-d, and 515-e) are shown by way of example. In some examples, the size of the personas displayed in the top personas display 512 may be indicative of a number of users sharing a number of common attributes.

Each of the top personas displayed in the top personas display 512 may be associated with a number of attributes that are common to a plurality of users. As described above, the listing of top personas is based on a Segmentation FP analysis. For example, the Segmentation FP analysis conducted on users that are known pet owners may result in top personas 515-a, 515-b, 515-c, 515-d, and 515-e. The attributes associated with each of personas 515-a, 515-b, 515-c, 515-d, and 515-e may be different. For example, persona 515-a may be associated with the greatest number of users (e.g., the greatest number of devices) and may include the attributes: likely in the market for a used vehicle, are vegan, are a health enthusiast, and likely in the market for a new vehicle.

Additionally or alternatively, persona 515-d may be associated with the fourth-most number of users (e.g., the fourth-most number of devices) and may include the attributes: home renter and likely to purchase a home. In some examples a listing of specific attributes may be displayed at listing of attributes 530 and a number of users associated with a persona (e.g., a number of devices associated with a persona) may be displayed at persona information display 520. The information displayed at persona information display 520 may, in some examples, be based on a user selecting a specific persona (e.g., persona 515-a, 515-b, 515-c, 515-d, or 515-e) in the top personas display 512. As described above, the top personas may be updated in real-time based on changes and/or additions to the user data stored at the multi-tenant database server. Accordingly, the top personas display 512 may be updated in real-time.

In some examples, the personas depicted by user interface 510 (e.g., personas 515-a, 515-b, 515-c, 515-d, and 515-e) may be generated and/or depicted based on a measurement of the extent to which highly-ranked patterns are more visually diverse or representative to the user than lower-ranked patterns. For example, persona 515-a may be more visually diverse or representative than 515-b, as indicated by the visual sizing of persona 515-a. To determine the visual diversity and/or representativeness of any one persona, a multi-tenant database server may search for a set of patterns that convey greater value to the user beyond a simple sum of each pattern in the set's individual value. Stated another way, the multi-tenant database server may consider the partition consisting of the set of patterns that are highly-ranked. Given this partition, the multi-tenant database server may measure the opposite of the extent to which the user is upset or surprised at finding certain patterns. This may, for example, minimize any extraneous (e.g., extraneous to the user), given any one set of patterns.

In some examples, whether the user is upset or surprised at finding certain patterns may be measured by considering the relative surprise of seeing item $a_1$ in pattern p given the additional presence of items $a_2$, $a_3$, . . . , as well as the relative rankings of all the other items in the list. This approach may not merely rank all patterns, but all permutations of patterns. By using such an approach, the main driver of surprise at excluding a given pattern from the "top" may be driven by the presence of a single item of interest in the pattern. In some examples, the construction of relevant and interesting data attribute pattern groups may be based on the Kullback-Leibler (KL) divergence algorithm. For example, five additional personas may be calculated (e.g., in addition to personas 515-a, 515-b, 515-c, 515-d, or 515-e). The calculation may begin with calculating the KL-divergence values for each of the five possible next patterns. The calculations may be, for example:

| next pattern candidate | KL-divergence |
|---|---|
| CD | 1.987302748 |
| BC | 1.987302748 |
| BD | 1.987302748 |
| ABC | 0.9826779887 |
| ABE | 0 |

In some examples, ABE may be the next pattern ranked, as it minimizes the KL-divergence value. Such a minimization may be preferable, as choosing any of the other patterns (e.g., CD, BC, BD, ABC) may add redundant or less-visually-diverse patterns to top personas display 512.

Figure 6:
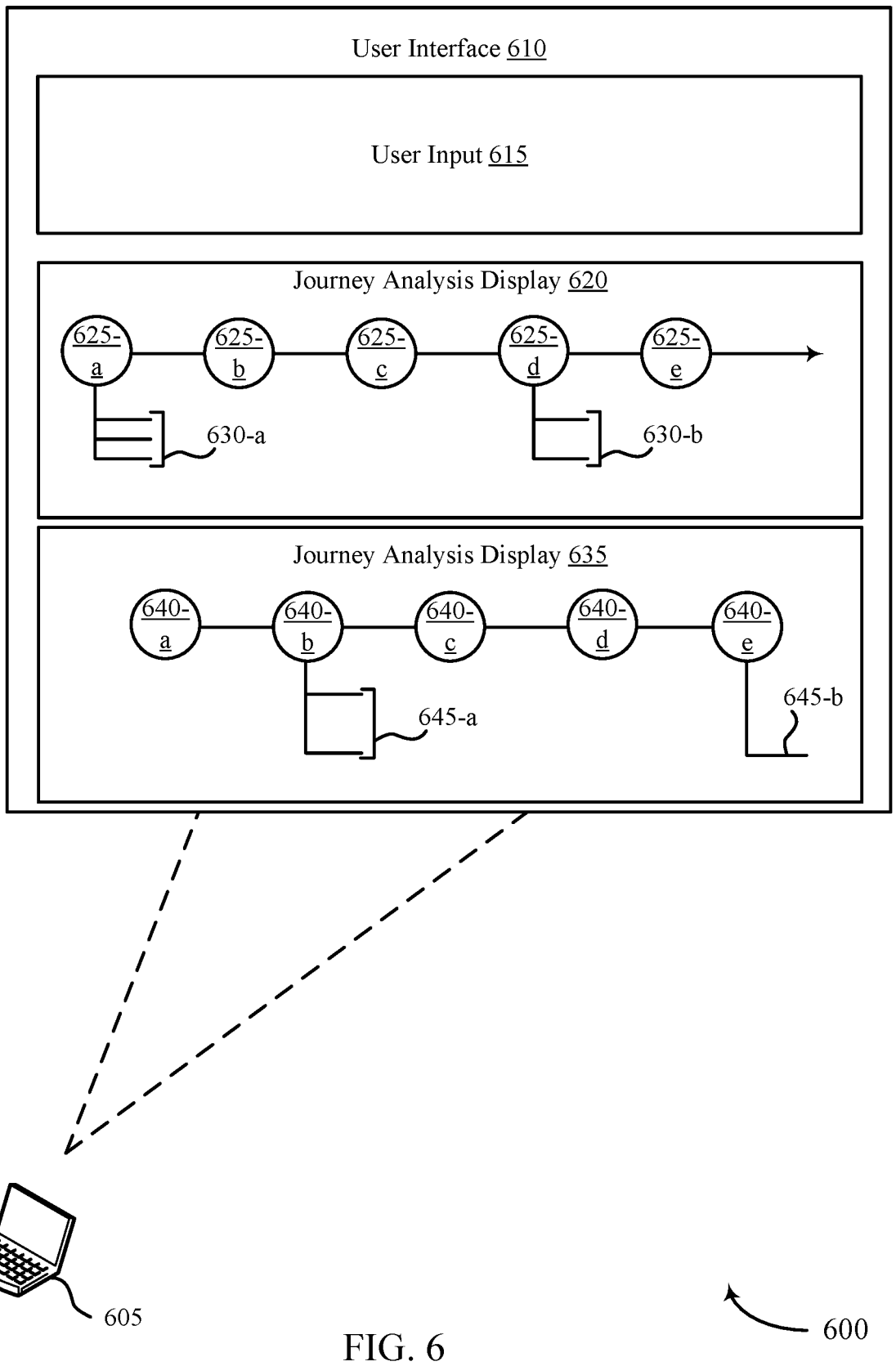
FIG. 6 illustrates an example of a user interface that supports FP analysis in accordance with aspects of the present disclosure.

FIG. 6 illustrates an example of a user device 605 that supports a user interface 610 that supports FP analysis in accordance with aspects of the present disclosure. User interface 610 may support Journey FP analysis, as described above, and may include a user input 615, Journey analysis display 620, and Journey analysis display 635. In some examples, Journey analysis display 620 may include data attribute patterns 625-a, 625-b, 625-c, 625-d, and 625-e. Data attribute patterns 625-a and 625-d may include additional data attribute patterns, which may be referred to as a subset of data attribute patterns 630-a and 630-b, respectively. In some examples, Journey analysis display 635 may include data attribute patterns 640-a, 640-b, 640-c, 640-d, and 640-e. Data attribute patterns 640-b and 640-d may include additional data attribute patterns, which may be referred to as a subset of data attribute patterns 645-a and 645-b, respectively. Additionally or alternatively, user input 615 may allow for a user to input (e.g., identify) a resulting data attribute for analysis in the Journey FP analysis. User interface 610 may be displayed on a user device 605, which may be an example of user device 420 as described with reference to FIG. 4, based on data received from a plurality of users (e.g., users 410 as described with reference to FIG. 4).

User interface 610 may support Journey FP analysis as described above with reference to FIG. 3. A user may wish to understand various interactions and patterns between data attributes associated with multiple users. In some examples, the data used to determine various interactions and patterns may be associated with real-life events of multiple users (e.g., users 310, 310-a as described with reference to FIG. 3). For example, a user may wish to know what events (e.g., what data attributes) contributed to a user purchasing a particular movie ticket (e.g., a resulting data attribute). Accordingly, to conduct such an analysis, a user may first enter (e.g., select) this information using user input 615. In some examples, the user may select the desired resulting data attribute by making a selection via a prepopulated list (e.g., a dropdown menu) and, in other examples, the user may select the desired resulting data attribute by manually entering the resulting data attribute or an indication of the resulting data attribute.

After a user enters a resulting data attribute by interacting with user input 615, a Journey FP analysis may occur (e.g., at multi-tenant database server 305 as described with reference to FIG. 3; via multi-tenant database server 305 as described with reference to FIG. 3). As described above, the multi-tenant database server may calculate a probability change corresponding to a difference between a probability that the resulting data attribute is in a data attribute pattern comprising the set of input data attributes and a probability that the resulting data attribute is in a data attribute pattern not comprising the set of input data attributes. Stated another way, the multi-tenant database server may determine, based on comparing various data attributes, the probability that any one attribute contributed to the user purchasing the particular ticket, and the probability that any one attribute did not contribute to the user purchasing the particular ticket. Based on this probabilistic analysis, the multi-tenant database server may determine a set of attributes that contributed to the resulting data attribute (e.g., contributed to the user purchasing the ticket).

In some examples, journey analysis display 620 may indicate a sequential determined set of input data attributes (e.g., data attribute patterns 625-a, 625-b, 625-c, 625-d, and 625-e) based on the desired resulting data attribute. For example, based on the Journey FP analysis, journey analysis display 620 may indicate that the sequence of data attribute patterns 625-a, 625-b, 625-c, 625-d, and 625-e contributed to a user purchasing a particular movie ticket. In some examples, data attribute pattern 625-a may be associated with a user shopping online, data attribute pattern 625-b may be associated with a user visiting a movie review website, data attribute pattern 625-c may be associated with a user selecting a particular advertisement while visiting the movie review website, data attribute pattern 625-d may be associated with a user watching particular movie trailers, and data attribute pattern 625-e may be associated with a user reading a movie review.

In some examples, journey analysis display 620 may also indicate additional data attribute patterns (e.g., subset of data attribute patterns 630-a and 630-b). For example, subset of data attribute patterns 630-a may indicate that, when shopping online, the user purchased red shoes, a white hat, and black shorts. Additionally or alternatively, subset of data attribute patterns 630-b may indicate, by name, two specific movie trailers that the user watched. Thus, the Journey FP analysis may indicate, and journey analysis display 620 may depict, what sequential attributes are common to a user who purchased a particular movie ticket.

In other examples, journey analysis display 635 may indicate a non-sequential determined set of input data attributes (e.g., data attribute patterns 640-a, 640-b, 640-c, 640-d, and 640-e) based on the desired resulting data attribute. For example, based on the Journey FP analysis, journey analysis display 635 may indicate that the data attribute patterns 625-a, 625-b, 625-c, 625-d, and 625-e contributed to a user purchasing a particular movie ticket. As described above, data attribute pattern 640-a may be associated with a user shopping online, data attribute pattern 640-b may be associated with a user visiting a movie review website, data attribute pattern 640-c may be associated with a user selecting a particular advertisement while visiting the movie review website, data attribute pattern 640-d may be associated with a user watching particular movie trailers, and data attribute pattern 640-e may be associated with a user reading a movie review.

In some examples, journey analysis display 635 may also indicate additional data attribute patterns (e.g., subset of data attribute patterns 645-a and 645-b). For example, subset of data attribute patterns 645-a may indicate, by name, two specific movie review websites that a user visited. Additionally or alternatively, subset of data attribute patterns 645-b may indicate, by name, a specific movie that the user read a review of. Thus, the Journey FP analysis may indicate, and journey analysis display 635 may depict, what non-sequential attributes are common to a user who purchased a particular movie ticket.

In some examples, journey analysis display 620 may depict the attributes common to a user who purchased a particular movie ticket with greater granularity. For example, by including the sequence of events in a Journey FP analysis, the number of potential results could not be greater than if the sequence of events was not included in the analysis. Accordingly, journey analysis display 635 may be indicative of a greater number of users—thus providing a user with less-granular information, but indicative of a greater number of individuals. Conversely, journey analysis display 620 may be indicative of a lesser number of users—thus providing a user with more-granular information, but indicative of a lesser number of individuals.

In some examples, a user may input (e.g., via user input 615) a time range the data set, the resulting data attribute for analysis, an input data attribute to test, or whether to display the journeys with the greatest positive probability change or the greatest negative probability change. By altering one or more of the aforementioned inputs, the Journey analysis display and/or the Journey analysis display 635 may be updated accordingly.

Figure 7:
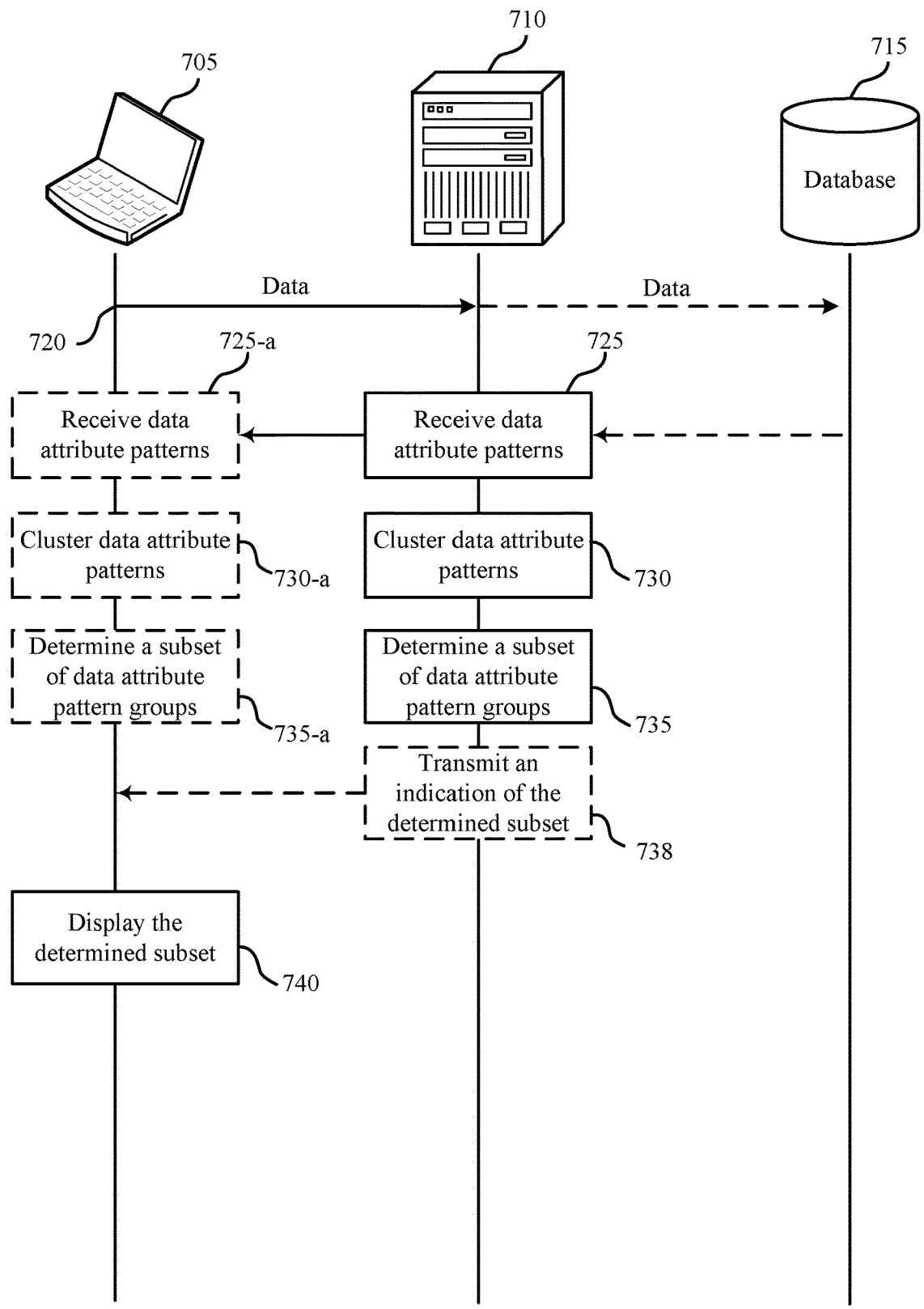
FIGS. 7 and 8 illustrate examples of process flows that support FP analysis in accordance with aspects of the present disclosure.

FIG. 7 illustrates an example of a process flow 700 that supports FP analysis in accordance with aspects of the present disclosure. The process flow 700 may include a computing device 705, which may be an example of a user 310, 310-a as described with reference to FIG. 3; a multi-tenant database server 710, which may be an example of the multi-tenant database server 305 as described with reference to FIG. 2; and a database 715, which may be an example of database 350 as described with reference to FIG. 3.

Process flow 700 may be an example of displaying user interface 510 as described with reference to FIG. 5. In some examples, the computing device 705 may transmit data 720 to multi-tenant database server 710. As described above, the data may be or may include for example, browser data, application data, usage data, and the like. In other examples, the computing device may transmit data 720 to database 715.

In some examples, the multi-tenant database server 710 may receive a set of data attribute patterns 725 (e.g., from database 715). The set of data attribute patterns may be for a data set comprising a plurality of data objects. In some examples, the set of data attribute patterns may be determined based at least in part on a FP analysis of the data set. In other examples, the computing device 705 may receive a set of data attribute patterns 725-a (e.g., from multi-tenant database server 710). As described above, the set of data attribute patterns may be for a data set comprising a plurality of data objects and may be determined based at least in part on a FP analysis of the data set.

In some examples, after receiving the set of data attribute patterns (e.g., 725, 725-a), the multi-tenant database server 710 may cluster the set of data attribute patterns 730. The multi-tenant database server 710 may cluster the set of data attribute patterns into a set of data attribute pattern groups based at least in part on a pattern association factor and a number of data objects of the plurality of data objects common between data attribute patterns of the data attribute pattern groups. In other examples, the computing device 705 may cluster the set of data attribute patterns 730-a (e.g., if the computing device 705 received the data attribute patterns 725-a). As described above, the computing device 705 may cluster the set of data attribute patterns into a set of data attribute pattern groups based at least in part on a pattern association factor and a number of data objects of the plurality of data objects common between data attribute patterns of the data attribute pattern groups.

In some examples, after clustering the data attribute patterns, the multi-tenant database server 710 may determine a subset of data attribute pattern groups 735. The multi-tenant database server 710 may determine the subset of the set of data attribute pattern groups for display based at least in part on a level of data object coverage of the subset of data attribute pattern groups and a level of data attribute coverage of the subset of data attribute pattern groups. In other examples, the computing device 705 may determine the subset of data attribute pattern groups 735-a (e.g., if the computing device 705 clusters the set of data attribute patterns). As described above, the computing device 705 may determine the subset of the set of data attribute pattern groups for display based at least in part on a level of data object coverage of the subset of data attribute pattern groups and a level of data attribute coverage of the subset of data attribute pattern groups.

In some examples, the computing device 705 may display, in a user interface, the determined subset of data attribute pattern groups 740. In some examples, the multi-tenant database server 710 may transmit an indication of the determined subset 738, which may subsequently be displayed at the computing device 705. Whether the multi-tenant database server 710 transmits the indication of the determined subset 738 is based on whether the computing device 705 or the multi-tenant database server 710 determines the subset of data attribute pattern groups (e.g., 735, 735-a).

In some examples (not shown), the computing device 705 may receive, via the user interface a user input signal indicating a data attribute of interest. In some examples, either the computing device 705 or the multi-tenant database server may subsequently determine the subset of data attribute pattern groups based at least in part on the user input signal. In some examples, each data attribute pattern group of the subset of data attribute pattern groups may be associated with the data attribute of interest.

In some examples (not shown), the computing device 705 may receive, in the user interface, a user input signal indicating the pattern association factor. In some examples, the clustering (e.g., 730, 730-a) may be based at least in part on the user input signal.

In some examples (not shown), either the computing device 705 or the multi-tenant database server may construct the subset of data attribute pattern groups (e.g., 735, 735-a) according to a Kullback-Leibler (KL) Divergence Algorithm.

Figure 8:
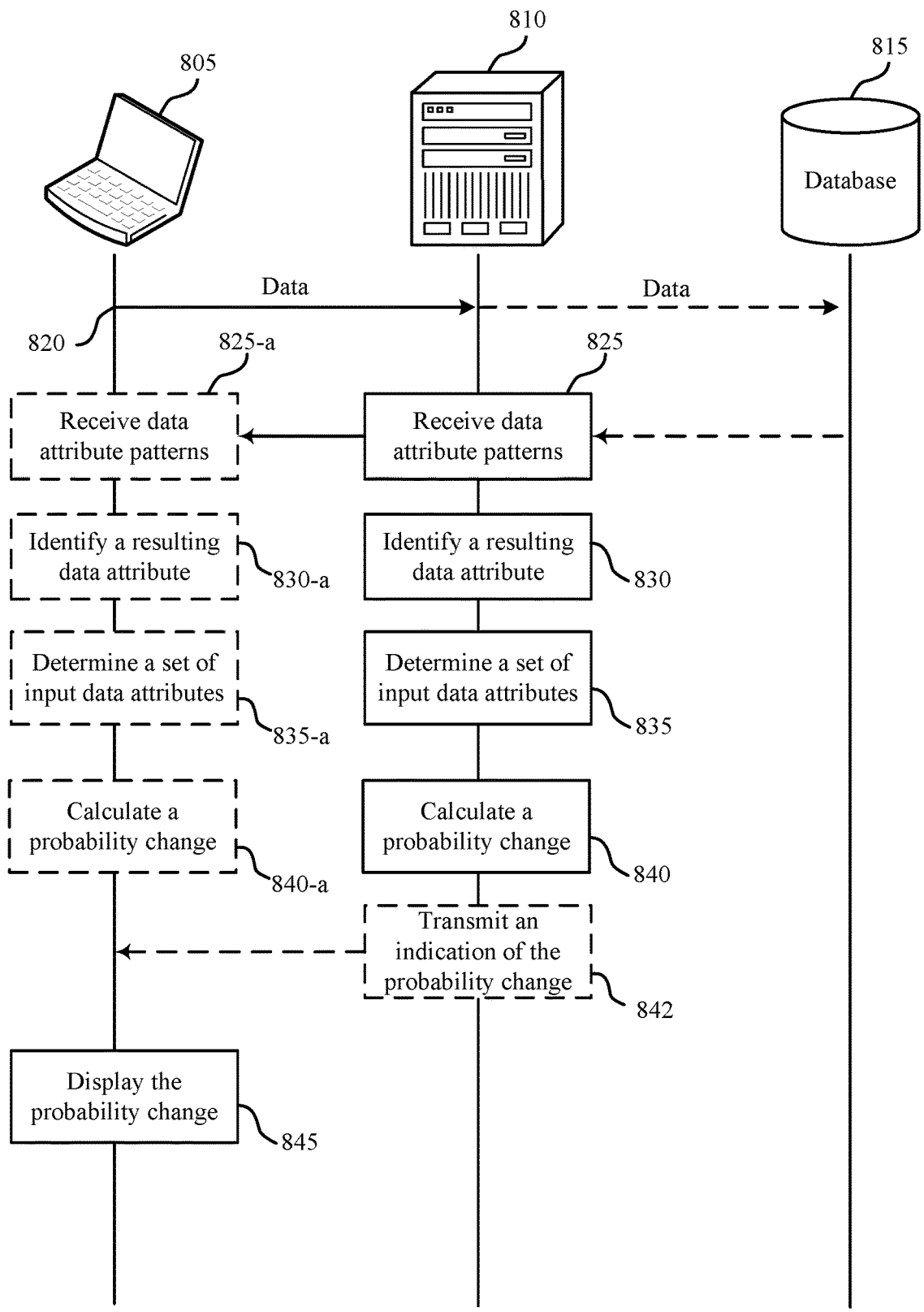

FIG. 8 illustrates an example of a process flow 800 that supports FP analysis in accordance with aspects of the present disclosure. The process flow 800 may include a computing device 805, which may be an example of a user 310, 310-a as described with reference to FIG. 3; a multi-tenant database server 810, which may be an example of the multi-tenant database server 305 as described with reference to FIG. 3; and a database 815, which may be an example of database 350 as described with reference to FIG. 3.

Process flow 800 may be an example of displaying user interface 610 as described with reference to FIG. 6. In some examples, the computing device 805 may transmit data 820 to multi-tenant database server 810. As described above, the data may be or may include for example, browser data, application data, usage data, and the like. In other examples, the computing device may transmit data 820 to database 815.

In some examples, the multi-tenant database server 810 may receive a set of data attribute patterns 825 (e.g., from database 815). The set of data attribute patterns may be for a data set comprising a plurality of data objects. In some examples, the set of data attribute patterns may be determined based at least in part on a FP analysis of the data set. In other examples, the computing device 805 may receive a set of data attribute patterns 825-*a* (e.g., from multi-tenant database server 810). As described above, the set of data attribute patterns may be for a data set comprising a plurality of data objects and may be determined based at least in part on a FP analysis of the data set.

In some examples, after receiving the set of data attribute patterns (e.g., 825, 825-*a*), the multi-tenant database server 810 may identify a resulting data attribute for analysis 830. In other examples, the computing device 805 may identify a resulting data attribute for analysis 830-*a* (e.g., if the computing device 805 received the data attribute patterns 825-*a*).

In some examples, after identifying a resulting data attribute for analysis, the multi-tenant database server 810 may determine a set of input data attributes corresponding to the resulting data attribute for analysis 835. In some examples, the determination may be based at least in part on the set of data attribute patterns and the resulting data attribute. In other examples, the computing device 805 may determine the set of input data attributes corresponding to the resulting data attribute for analysis 835-*a*. As described above, the determination may be based at least in part on the set of data attribute patterns and the resulting data attribute.

In some examples, after determining the set of input data attributes corresponding to the resulting data attribute for analysis (e.g., 835, 835-*a*), the multi-tenant database server 810 may calculating a probability change 840. In some examples, the probability change may correspond to a difference between a probability that the resulting data attribute is in a data attribute pattern comprising the set of input data attributes and a probability that the resulting data attribute is in a data attribute pattern not comprising the set of input data attributes. In other examples, the computing device 805 may calculate the probability change 840-*a*. As described above, the probability change may correspond to a difference between a probability that the resulting data attribute is in a data attribute pattern comprising the set of input data attributes and a probability that the resulting data attribute is in a data attribute pattern not comprising the set of input data attributes.

In some examples, the computing device 805 may display, in a user interface, the determined set of input data attributes and the calculated probability change 845. In some examples, the multi-tenant database server 810 may transmit an indication of the determined set of input data attributes and the calculated probability change 842, which may subsequently be displayed at the computing device 805. Whether the multi-tenant database server 810 transmits the indication of the determined set of input data attributes and the calculated probability change is based on whether the computing device 805 or the multi-tenant database server 810 calculates the probability change and/or determines the set of input data attributes.

In some examples (not shown), the computing device 805 may receive, in the user interface, a user input signal indicating the data set, a time range for the data set, the resulting data attribute for analysis, an input data attribute to include in the set of input data attributes, or a combination thereof.

In some examples (not shown), a user may select (e.g., via computing device 805), from a plurality of sets of input data attributes, the set of input data attributes with a greatest positive probability change value or a greatest negative probability change value.

In other examples (not shown), either the computing device 805 may receive, in the user interface, a user input signal indicating whether to select the set of input data attributes with the greatest positive probability change value or the greatest negative probability change value.

Figure 9:
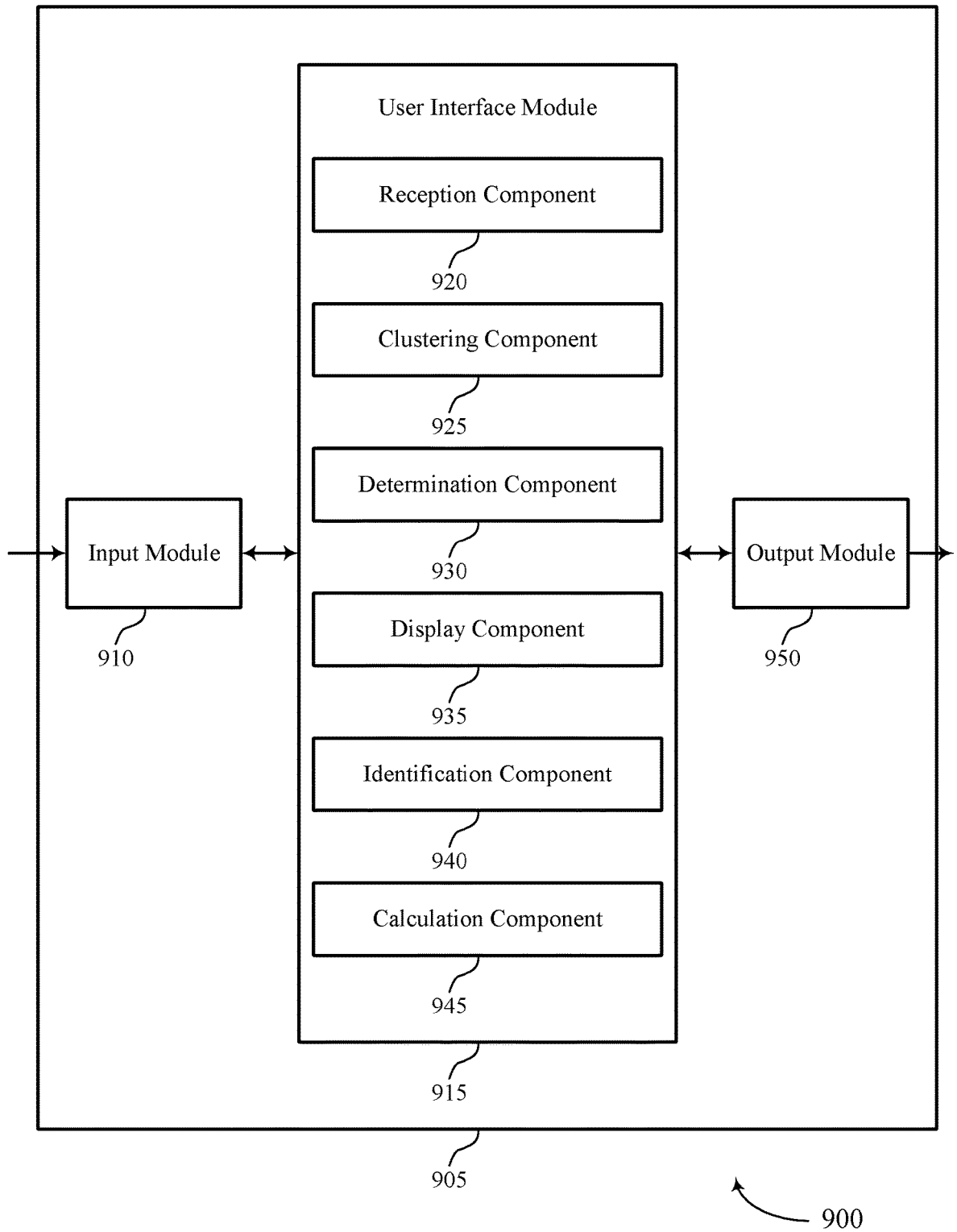
FIG. 9 illustrates a block diagram of an apparatus that supports FP analysis in accordance with aspects of the present disclosure.

FIG. 9 shows a block diagram 900 of an apparatus 905 that supports user interfaces for FP analysis in accordance with aspects of the present disclosure. The apparatus 905 may include an input module 910, an user interface module 915, and an output module 950. The apparatus 905 may also include a processor. Each of these components may be in communication with one another (e.g., via one or more buses). In some cases, the apparatus 905 may be an example of a user terminal, a database server, or a system containing multiple computing devices.

The input module 910 may manage input signals for the apparatus 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/9®, UNIX®, LINUX®, or another known operating system to handle input signals. The input module 910 may send aspects of these input signals to other components of the apparatus 905 for processing. For example, the input module 910 may transmit input signals to the user interface module 915 to support user interfaces for FP analysis. In some cases, the input module 910 may be a component of an input/output (I/O) controller 1115 as described with reference to FIG. 11.

The user interface module 915 may include a reception component 990, a clustering component 995, a determination component 930, a display component 935, an identification component 940, and a calculation component 945. The user interface module 915 may be an example of aspects of the user interface module 905 or 1010 described with reference to FIGS. 9 and 10.

The user interface module 915 and/or at least some of its various sub-components may be implemented in hardware, software executed by a processor, firmware, or any combination thereof. If implemented in software executed by a processor, the functions of the user interface module 915 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The user interface module 915 and/or at least some of its various sub-components may be physically located at various positions, including being distributed such that portions of functions are implemented at different physical locations by one or more physical devices. In some examples, the user interface module 915 and/or at least some of its various sub-components may be a separate and distinct component in accordance with various aspects of the present disclosure. In other examples, the user interface module 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The reception component 990 may receive a set of data attribute patterns for a data set including a set of data objects, where the set of data attribute patterns are determined based on a frequent pattern (FP) analysis of the data set. In some examples, the reception component 990 may receive a set of data attribute patterns for a data set including a set of data objects, where the set of data attribute patterns are determined based on a frequent pattern (FP) analysis of the data set.

The clustering component 995 may cluster the set of data attribute patterns into a set of data attribute pattern groups based on a pattern association factor and a number of data objects of the set of data objects common between data attribute patterns of the data attribute pattern groups.

The determination component 930 may determine a subset of data attribute pattern groups of the set of data attribute pattern groups for display based on a level of data object coverage of the subset of data attribute pattern groups and a level of data attribute coverage of the subset of data attribute pattern groups. In some examples, the determination component 930 may determine, based on the set of data attribute patterns and the resulting data attribute, a set of input data attributes corresponding to the resulting data attribute for analysis.

The display component 935 may display, in the user interface, the determined subset of data attribute pattern groups. In some examples, the display component 935 may display, in the user interface, the determined set of input data attributes and the calculated probability change.

The identification component 940 may identify a resulting data attribute for analysis.

The calculation component 945 may calculate a probability change corresponding to a difference between a probability that the resulting data attribute is in a data attribute pattern including the set of input data attributes and a probability that the resulting data attribute is in a data attribute pattern not including the set of input data attributes.

The output module 950 may manage output signals for the apparatus 905. For example, the output module 950 may receive signals from other components of the apparatus 905, such as the user interface module 915, and may transmit these signals to other components or devices. In some specific examples, the output module 950 may transmit output signals for display in a user interface, for storage in a database or data store, for further processing at a server or server cluster, or for any other processes at any number of devices or systems. In some cases, the output module 950 may be a component of an I/O controller 1115 as described with reference to FIG. 11.

Figure 10:
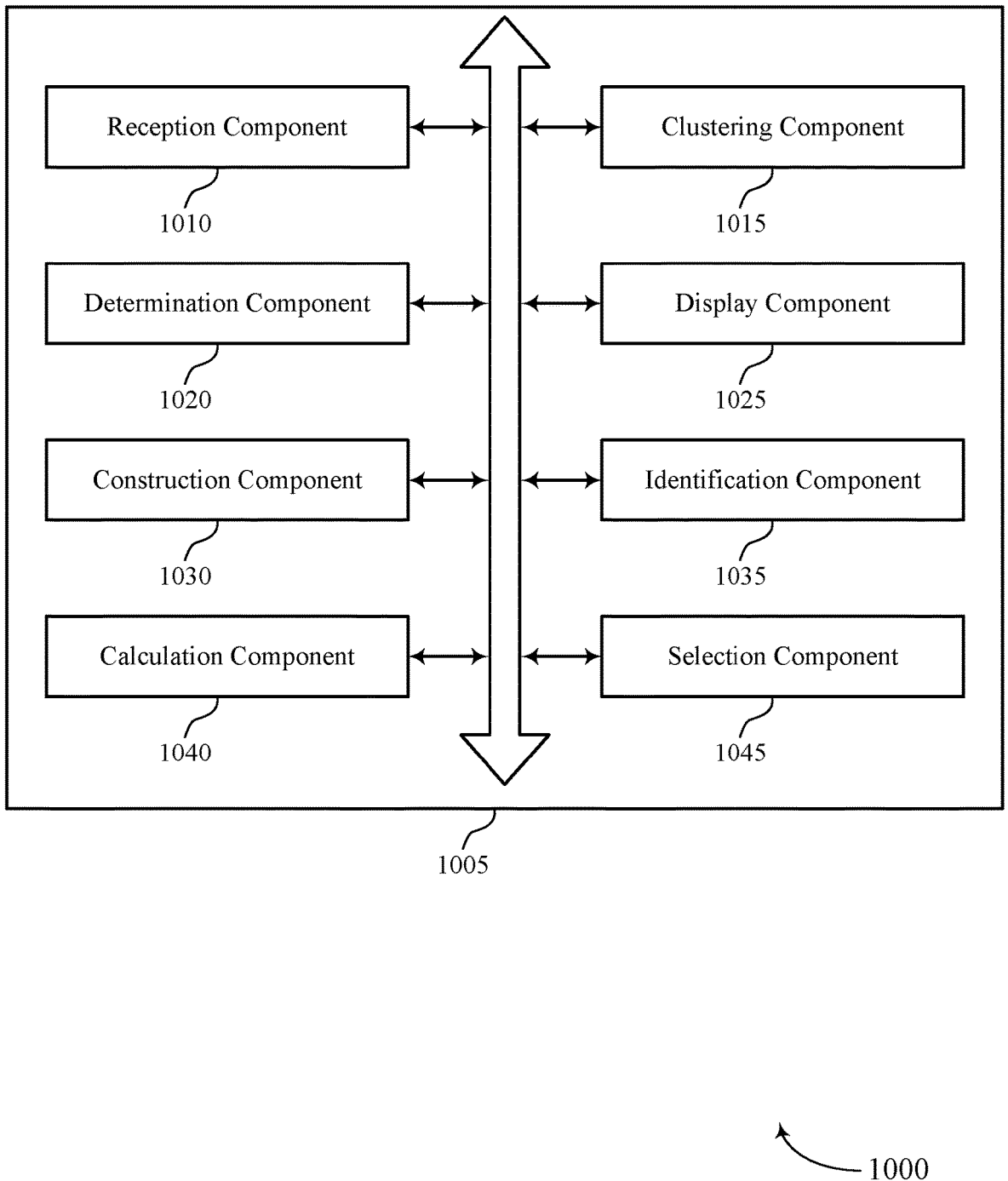
FIG. 10 illustrates a block diagram of a user interface that supports FP analysis in accordance with aspects of the present disclosure.

FIG. 10 shows a block diagram 1000 of a user interface module 1005 that supports user interfaces for FP analysis in accordance with aspects of the present disclosure. The user interface module 1005 may be an example of aspects of a user interface module as described herein. The user interface module 1005 may include a reception component 1010, a clustering component 1015, a determination component 1020, a display component 1025, a construction component 1030, an identification component 1035, a calculation component 1040, and a selection component 1045. Each of these modules may communicate, directly or indirectly, with one another (e.g., via one or more buses).

The reception component 1010 may receive a set of data attribute patterns for a data set including a set of data objects, where the set of data attribute patterns are determined based on a frequent pattern (FP) analysis of the data set. In some examples, the reception component 1010 may receive a set of data attribute patterns for a data set including a set of data objects, where the set of data attribute patterns are determined based on a frequent pattern (FP) analysis of the data set. In some examples, the reception component 1010 may receive, in the user interface, a user input signal indicating a data attribute of interest. In some examples, the reception component 1010 may receive, in the user interface, a user input signal indicating the pattern association factor, where the clustering is based on the user input signal. In some examples, the reception component 1010 may receive, in the user interface, a user input signal indicating the data set, a time range for the data set, the resulting data attribute for analysis, an input data attribute to include in the set of input data attributes, or a combination thereof. In some examples, the reception component 1010 may receive, in the user interface, a user input signal indicating whether to select the set of input data attributes with the greatest positive probability change value or the greatest negative probability change value.

The clustering component 1015 may cluster the set of data attribute patterns into a set of data attribute pattern groups based on a pattern association factor and a number of data objects of the set of data objects common between data attribute patterns of the data attribute pattern groups.

The determination component 1020 may determine a subset of data attribute pattern groups of the set of data attribute pattern groups for display based on a level of data object coverage of the subset of data attribute pattern groups and a level of data attribute coverage of the subset of data attribute pattern groups. In some examples, the determination component 1020 may determine, based on the set of data attribute patterns and the resulting data attribute, a set of input data attributes corresponding to the resulting data attribute for analysis. In some examples, the determination component 1020 may determine the subset of data attribute pattern groups based on the user input signal, where each data attribute pattern group of the subset of data attribute pattern groups is associated with the data attribute of interest.

The display component 1025 may display, in the user interface, the determined subset of data attribute pattern groups. In some examples, the display component 1025 may display, in the user interface, the determined set of input data attributes and the calculated probability change.

The construction component 1030 may construct the subset of data attribute pattern groups according to a Kullback-Leibler (KL) Divergence Algorithm.

The identification component 1035 may identify a resulting data attribute for analysis.

The calculation component 1040 may calculate a probability change corresponding to a difference between a probability that the resulting data attribute is in a data attribute pattern including the set of input data attributes and a probability that the resulting data attribute is in a data attribute pattern not including the set of input data attributes.

The selection component 1045 may select, from a set of sets of input data attributes, the set of input data attributes with a greatest positive probability change value or a greatest negative probability change value.

Figure 11:
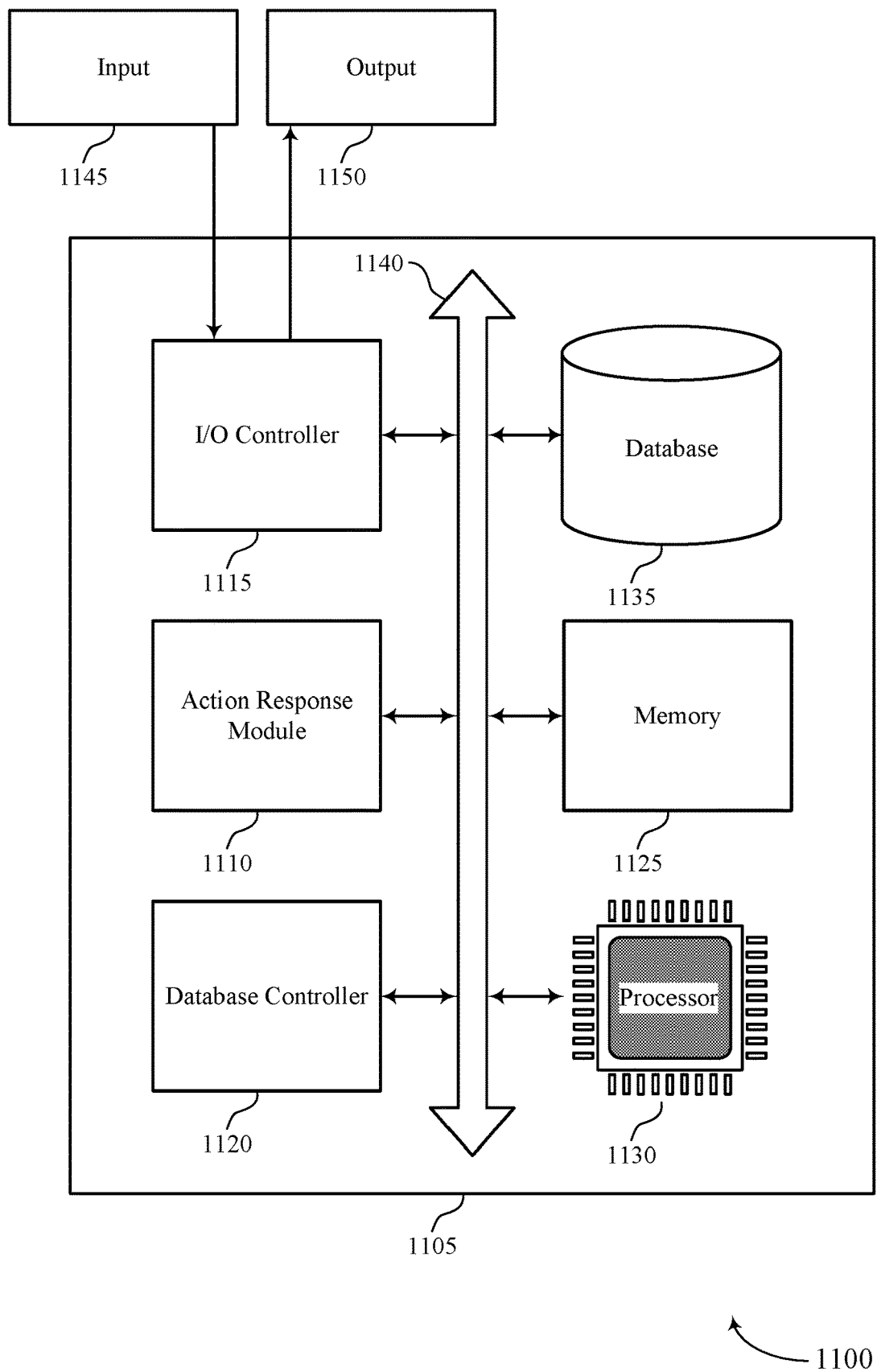
FIG. 11 illustrates a diagram of a system including a device that supports FP analysis in accordance with aspects of the present disclosure.

FIG. 11 shows a diagram of a system 1100 including a device 1105 that supports user interfaces for FP analysis in accordance with aspects of the present disclosure. The device 1105 may be an example of or include the components of a user device as described herein. The device 1105 may include components for bi-directional data communications including components for transmitting and receiving communications, including an user interface module 1110, an I/O controller 1115, a database controller 1120, memory 1125, a processor 1130, and a database 1135. These components may be in electronic communication via one or more buses (e.g., bus 1140).

The user interface module 1110 may be an example of a user interface module 915 or 1005 as described herein. For example, the user interface module 1110 may perform any of the methods or processes described above with reference to FIGS. 9 and 10. In some cases, the user interface module 1110 may be implemented in hardware, software executed by a processor, firmware, or any combination thereof.

The I/O controller 1115 may manage input signals 1145 and output signals 1150 for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The database controller 1120 may manage data storage and processing in a database 1135. In some cases, a user may interact with the database controller 1120. In other cases, the database controller 1120 may operate automatically without user interaction. The database 1135 may be an example of a single database, a distributed database, multiple distributed databases, a data store, a data lake, or an emergency backup database.

Memory 1125 may include random-access memory (RAM) and read-only memory (ROM). The memory 1125 may store computer-readable, computer-executable software including instructions that, when executed, cause the processor to perform various functions described herein. In some cases, the memory 1125 may contain, among other things, a basic input/output system (BIOS) which may control basic hardware or software operation such as the interaction with peripheral components or devices.

The processor 1130 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting user interfaces for FP analysis).

Figure 12:
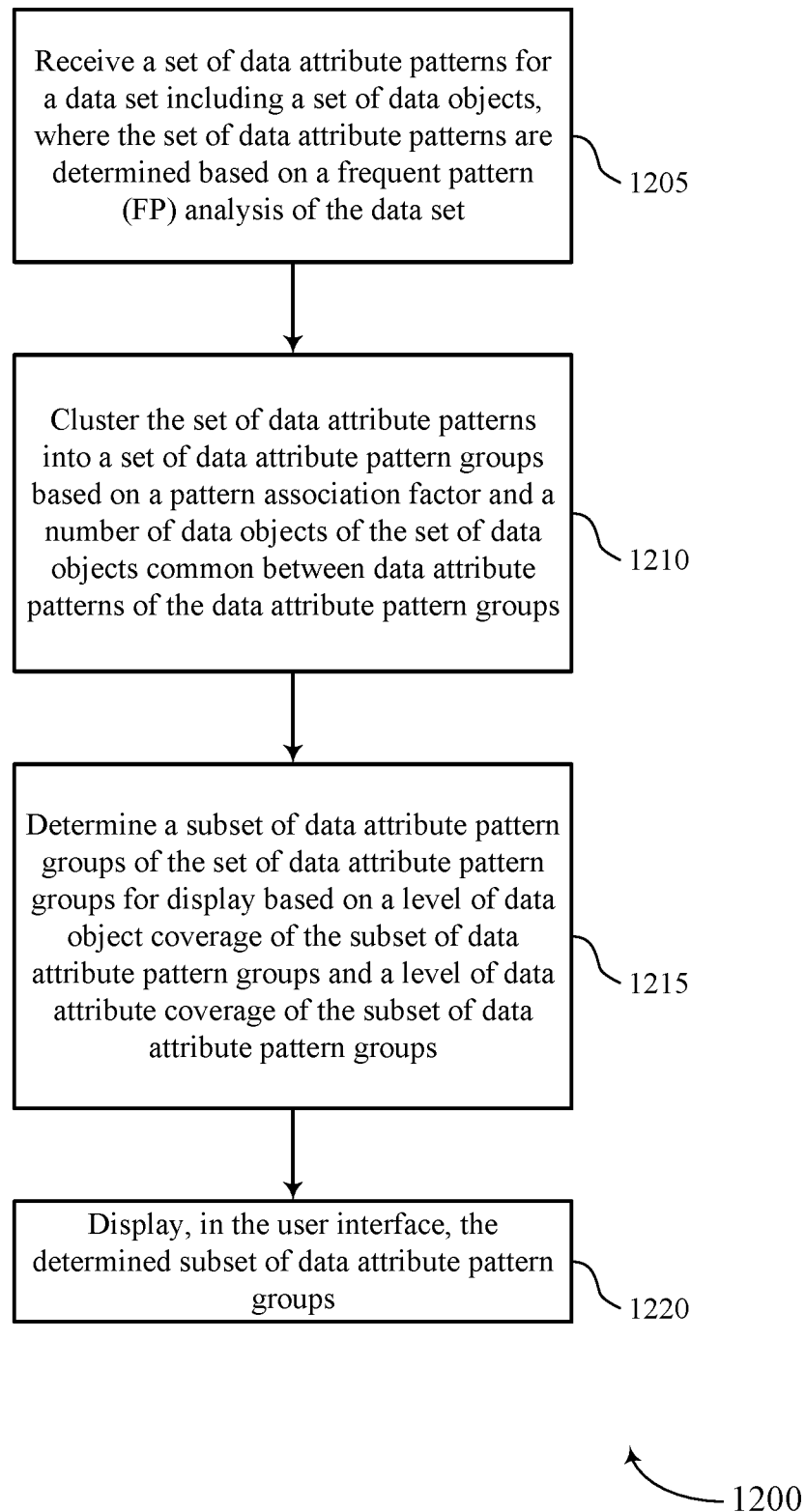
FIGS. 12 and 13 illustrate flowcharts of methods that support FP analysis in accordance with aspects of the present disclosure.

FIG. 12 shows a flowchart illustrating a method 1200 that supports user interfaces for FP analysis in accordance with aspects of the present disclosure. The operations of method 1200 may be implemented by a user device or its components as described herein. For example, the operations of method 1200 may be performed by an user interface module as described with reference to FIGS. 9 and 10. In some examples, a user device may execute a set of instructions to control the functional elements of the user device to perform the functions described below. Additionally or alternatively, a user device may perform aspects of the functions described below using special-purpose hardware.

At 1205, the user device may receive a set of data attribute patterns for a data set including a set of data objects, where the set of data attribute patterns are determined based on a frequent pattern (FP) analysis of the data set. The operations of 1205 may be performed according to the methods described herein. In some examples, aspects of the operations of 1205 may be performed by a reception component as described with reference to FIGS. 9 and 10.

At 1210, the user device may cluster the set of data attribute patterns into a set of data attribute pattern groups based on a pattern association factor and a number of data objects of the set of data objects common between data attribute patterns of the data attribute pattern groups. The operations of 1210 may be performed according to the methods described herein. In some examples, aspects of the operations of 1210 may be performed by a clustering component as described with reference to FIGS. 9 and 10.

At 1215, the user device may determine a subset of data attribute pattern groups of the set of data attribute pattern groups for display based on a level of data object coverage of the subset of data attribute pattern groups and a level of data attribute coverage of the subset of data attribute pattern groups. The operations of 1215 may be performed according to the methods described herein. In some examples, aspects of the operations of 1215 may be performed by a determination component as described with reference to FIGS. 9 and 10.

At 1220, the user device may display, in the user interface, the determined subset of data attribute pattern groups. The operations of 1220 may be performed according to the methods described herein. In some examples, aspects of the operations of 1220 may be performed by a display component as described with reference to FIGS. 9 and 10.

Figure 13:
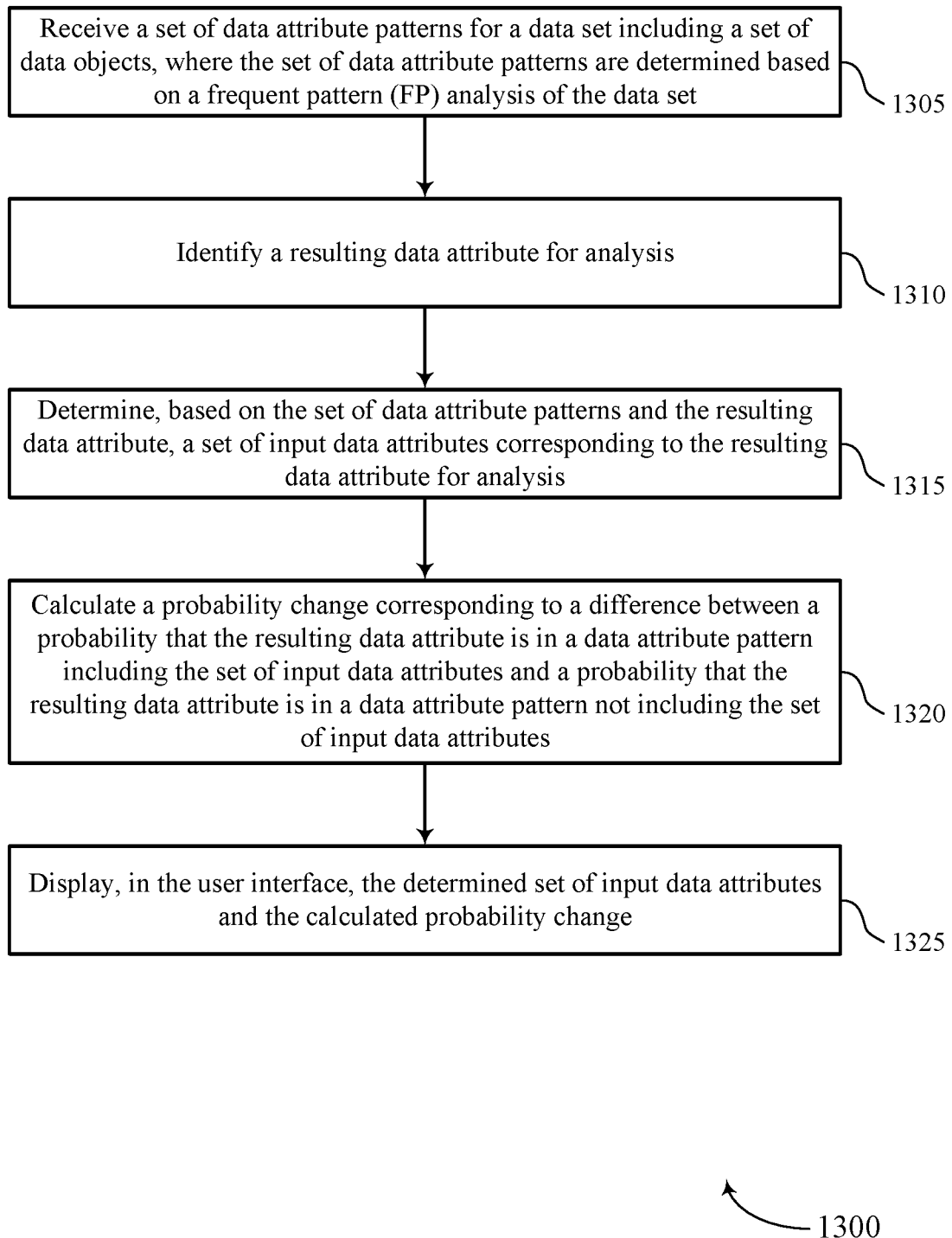

FIG. 13 shows a flowchart illustrating a method 1300 that supports user interfaces for FP analysis in accordance with aspects of the present disclosure. The operations of method 1300 may be implemented by a user device or its components as described herein. For example, the operations of method 1300 may be performed by a user interface module as described with reference to FIGS. 9 and 10. In some examples, a user device may execute a set of instructions to control the functional elements of the user device to perform the functions described below. Additionally or alternatively, a user device may perform aspects of the functions described below using special-purpose hardware.

At 1305, the user device may receive a set of data attribute patterns for a data set including a set of data objects, where the set of data attribute patterns are determined based on a frequent pattern (FP) analysis of the data set. The operations of 1305 may be performed according to the methods described herein. In some examples, aspects of the operations of 1305 may be performed by a reception component as described with reference to FIGS. 9 and 10.

At 1310, the user device may identify a resulting data attribute for analysis. The operations of 1310 may be performed according to the methods described herein. In some examples, aspects of the operations of 1310 may be performed by an identification component as described with reference to FIGS. 9 and 10.

At 1315, the user device may determine, based on the set of data attribute patterns and the resulting data attribute, a set of input data attributes corresponding to the resulting data attribute for analysis. The operations of 1315 may be performed according to the methods described herein. In some examples, aspects of the operations of 1315 may be performed by a determination component as described with reference to FIGS. 9 and 10.

At 1320, the user device may calculate a probability change corresponding to a difference between a probability that the resulting data attribute is in a data attribute pattern including the set of input data attributes and a probability that the resulting data attribute is in a data attribute pattern not including the set of input data attributes. The operations of 1320 may be performed according to the methods described herein. In some examples, aspects of the operations of 1320 may be performed by a calculation component as described with reference to FIGS. 9 and 10.

At 1325, the user device may display, in the user interface, the determined set of input data attributes and the calculated probability change. The operations of 1325 may be performed according to the methods described herein. In some examples, aspects of the operations of 1325 may be performed by a display component as described with reference to FIGS. 9 and 10.

It should be noted that the methods described above describe possible implementations, and that the operations and the steps may be rearranged or otherwise modified and that other implementations are possible. Furthermore, aspects from two or more of the methods may be combined.

A method of modifying data for display in a user interface is described. The method may include receiving a set of data attribute patterns for a data set including a set of data objects, where the set of data attribute patterns are determined based on a frequent pattern (FP) analysis of the data set, clustering the set of data attribute patterns into a set of data attribute pattern groups based on a pattern association factor and a number of data objects of the set of data objects common between data attribute patterns of the data attribute pattern groups, determining a subset of data attribute pattern groups of the set of data attribute pattern groups for display based on a level of data object coverage of the subset of data attribute pattern groups and a level of data attribute coverage of the subset of data attribute pattern groups, and displaying, in the user interface, the determined subset of data attribute pattern groups.

An apparatus for modifying data for display in a user interface is described. The apparatus may include a processor, memory in electronic communication with the processor, and instructions stored in the memory. The instructions may be executable by the processor to cause the apparatus to receive a set of data attribute patterns for a data set including a set of data objects, where the set of data attribute patterns are determined based on a frequent pattern (FP) analysis of the data set, cluster the set of data attribute patterns into a set of data attribute pattern groups based on a pattern association factor and a number of data objects of the set of data objects common between data attribute patterns of the data attribute pattern groups, determine a subset of data attribute pattern groups of the set of data attribute pattern groups for display based on a level of data object coverage of the subset of data attribute pattern groups and a level of data attribute coverage of the subset of data attribute pattern groups, and display, in the user interface, the determined subset of data attribute pattern groups.

An apparatus for modifying data for display in a user interface is described. The apparatus may include means for receiving a set of data attribute patterns for a data set including a set of data objects, where the set of data attribute patterns are determined based on a frequent pattern (FP) analysis of the data set, clustering the set of data attribute patterns into a set of data attribute pattern groups based on a pattern association factor and a number of data objects of the set of data objects common between data attribute patterns of the data attribute pattern groups, determining a subset of data attribute pattern groups of the set of data attribute pattern groups for display based on a level of data object coverage of the subset of data attribute pattern groups and a level of data attribute coverage of the subset of data attribute pattern groups, and displaying, in the user interface, the determined subset of data attribute pattern groups.

A non-transitory computer-readable medium storing code for modifying data for display in a user interface is described. The code may include instructions executable by a processor to receive a set of data attribute patterns for a data set including a set of data objects, where the set of data attribute patterns are determined based on a frequent pattern (FP) analysis of the data set, cluster the set of data attribute patterns into a set of data attribute pattern groups based on a pattern association factor and a number of data objects of the set of data objects common between data attribute patterns of the data attribute pattern groups, determine a subset of data attribute pattern groups of the set of data attribute pattern groups for display based on a level of data object coverage of the subset of data attribute pattern groups and a level of data attribute coverage of the subset of data attribute pattern groups, and display, in the user interface, the determined subset of data attribute pattern groups.

Some examples of the method, apparatuses, and non-transitory computer-readable medium described herein may further include operations, features, means, or instructions for receiving, in the user interface, a user input signal indicating a data attribute of interest and determining the subset of data attribute pattern groups based on the user input signal, where each data attribute pattern group of the subset of data attribute pattern groups may be associated with the data attribute of interest.

Some examples of the method, apparatuses, and non-transitory computer-readable medium described herein may further include operations, features, means, or instructions for receiving, in the user interface, a user input signal indicating the pattern association factor, where the clustering may be based on the user input signal.

In some examples of the method, apparatuses, and non-transitory computer-readable medium described herein, determining the subset of data attribute pattern groups further may include operations, features, means, or instructions for constructing the subset of data attribute pattern groups according to a Kullback-Leibler (KL) Divergence Algorithm.

A method of modifying data for display in a user interface is described. The method may include receiving a set of data attribute patterns for a data set including a set of data objects, where the set of data attribute patterns are determined based on a frequent pattern (FP) analysis of the data set, identifying a resulting data attribute for analysis, determining, based on the set of data attribute patterns and the resulting data attribute, a set of input data attributes corresponding to the resulting data attribute for analysis, calculating a probability change corresponding to a difference between a probability that the resulting data attribute is in a data attribute pattern including the set of input data attributes and a probability that the resulting data attribute is in a data attribute pattern not including the set of input data attributes, and displaying, in the user interface, the determined set of input data attributes and the calculated probability change.

An apparatus for modifying data for display in a user interface is described. The apparatus may include a processor, memory in electronic communication with the processor, and instructions stored in the memory. The instructions may be executable by the processor to cause the apparatus to receive a set of data attribute patterns for a data set including a set of data objects, where the set of data attribute patterns are determined based on a frequent pattern (FP) analysis of the data set, identify a resulting data attribute for analysis, determine, based on the set of data attribute patterns and the resulting data attribute, a set of input data attributes corresponding to the resulting data attribute for analysis, calculate a probability change corresponding to a difference between a probability that the resulting data attribute is in a data attribute pattern including the set of input data attributes and a probability that the resulting data attribute is in a data attribute pattern not including the set of input data attributes, and display, in the user interface, the determined set of input data attributes and the calculated probability change.

An apparatus for modifying data for display in a user interface is described. The apparatus may include means for receiving a set of data attribute patterns for a data set including a set of data objects, where the set of data attribute patterns are determined based on a frequent pattern (FP) analysis of the data set, identifying a resulting data attribute for analysis, determining, based on the set of data attribute patterns and the resulting data attribute, a set of input data attributes corresponding to the resulting data attribute for analysis, calculating a probability change corresponding to a difference between a probability that the resulting data attribute is in a data attribute pattern including the set of input data attributes and a probability that the resulting data attribute is in a data attribute pattern not including the set of input data attributes, and displaying, in the user interface, the determined set of input data attributes and the calculated probability change.

A non-transitory computer-readable medium storing code for modifying data for display in a user interface is described. The code may include instructions executable by a processor to receive a set of data attribute patterns for a data set including a set of data objects, where the set of data attribute patterns are determined based on a frequent pattern (FP) analysis of the data set, identify a resulting data attribute for analysis, determine, based on the set of data attribute patterns and the resulting data attribute, a set of input data attributes corresponding to the resulting data attribute for analysis, calculate a probability change corresponding to a difference between a probability that the resulting data attribute is in a data attribute pattern including the set of input data attributes and a probability that the resulting data attribute is in a data attribute pattern not including the set of input data attributes, and display, in the user interface, the determined set of input data attributes and the calculated probability change.

Some examples of the method, apparatuses, and non-transitory computer-readable medium described herein may further include operations, features, means, or instructions for receiving, in the user interface, a user input signal indicating the data set, a time range for the data set, the resulting data attribute for analysis, an input data attribute to include in the set of input data attributes, or a combination thereof.

In some examples of the method, apparatuses, and non-transitory computer-readable medium described herein, determining the set of input data attributes corresponding to the resulting data attribute for analysis may include operations, features, means, or instructions for selecting, from a set of sets of input data attributes, the set of input data attributes with a greatest positive probability change value or a greatest negative probability change value.

Some examples of the method, apparatuses, and non-transitory computer-readable medium described herein may further include operations, features, means, or instructions for receiving, in the user interface, a user input signal indicating whether to select the set of input data attributes with the greatest positive probability change value or the greatest negative probability change value.

In some examples of the method, apparatuses, and non-transitory computer-readable medium described herein, the set of input data attributes includes an indication of a specific sequence for the set of input data attributes.

In some examples of the method, apparatuses, and non-transitory computer-readable medium described herein, a data attribute of a data object of the set of data objects includes a parameter corresponding to a web browser activity of a user, a user device, or a combination thereof.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for displaying a subset of data attribute pattern groups corresponding to a user-selected persona type in a user interface, comprising:
   receiving a set of data attribute patterns associated with user data for a data set comprising a plurality of data objects, wherein the set of data attribute patterns are determined based at least in part on a frequent pattern (FP) analysis of the data set, and wherein the FP analysis comprises:
      constructing a condensed data structure that includes an FP tree and a linked list based at least in part on making two passes through the data set, the FP tree comprising a plurality of nodes corresponding to data attributes in the data set, the linked list comprising a plurality of entries that point to nodes of the FP tree;
   receiving, in the user interface, a user input signal comprising the user-selected persona type, wherein the user-selected persona type comprises one or more data attributes that define a characterization of a user;
   receiving, in the user interface, a frequency value for a frequency threshold and a recentness value for a recentness threshold, the recentness threshold comprising a time period associated with the set of data attribute patterns;
   clustering the set of data attribute patterns into a set of data attribute pattern groups based at least in part on the frequency threshold and the recentness threshold from the user input signal and a number of data objects of the plurality of data objects common between data attribute patterns of the data attribute pattern groups;
   determining the subset of data attribute pattern groups from the set of data attribute pattern groups for display based at least in part on the user-selected persona type from the user input signal, a level of data object coverage of the subset of data attribute pattern groups, and a level of data attribute coverage of the subset of data attribute pattern groups;
   displaying, in the user interface, the determined subset of data attribute pattern groups corresponding to the user-selected persona type from the user input signal; and
   updating the displayed subset of data attribute pattern groups based at least in part on receiving, in the user interface, a second user input signal comprising a second user-selected persona type, a second recentness threshold, a second frequency threshold, a second data attribute of interest, or a combination thereof.

2. The method of claim 1, wherein receiving the user input signal comprises:
   receiving a data attribute of interest; and wherein determining the subset of data attribute pattern groups comprises:
      determining the subset of data attribute pattern groups based at least in part on the user input signal, wherein each data attribute pattern group of the subset of data attribute pattern groups is associated with the data attribute of interest.

3. The method of claim 1, wherein determining the subset of data attribute pattern groups further comprises:
   constructing the subset of data attribute pattern groups according to a Kullback-Leibler (KL) Divergence Algorithm.

4. The method of claim 1, further comprising:
   modifying the displayed subset of data attribute pattern groups based at least in part on receiving, in the user interface, a second user input signal comprising a second user-selected persona type, a second recentness threshold, a second frequency threshold, a second data attribute of interest, or a combination thereof.

5. A method for displaying a set of input data attributes corresponding to a user-selected resulting data attribute in a user interface, comprising:
receiving a set of data attribute patterns for a data set comprising a plurality of data objects, wherein the set of data attribute patterns are determined based at least in part on a frequent pattern (FP) analysis of the data set, and wherein the FP analysis comprises:
constructing a condensed data structure that includes an FP tree and a linked list based at least in part on making two passes through the data set, the FP tree comprising a plurality of nodes corresponding to data attributes in the data set, the linked list comprising a plurality of entries that point to nodes of the FP tree;
receiving, in the user interface, a user input signal comprising the user-selected resulting data attribute for analysis and a set of parameters for displaying the set of input data attributes corresponding to the user-selected resulting data attribute;
determining, based at least in part on the set of data attribute patterns and the user-selected resulting data attribute from the user input signal, the set of input data attributes corresponding to the user-selected resulting data attribute for analysis;
calculating a probability change corresponding to a difference between a probability that the user-selected resulting data attribute from the user input signal is in a data attribute pattern comprising the set of input data attributes and a probability that the user-selected resulting data attribute from the user input signal is in a data attribute pattern not comprising the set of input data attributes; and
displaying, in the user interface and based at least in part on the set of parameters from the user input signal, a sequence of the determined set of input data attributes corresponding to the user-selected resulting data attribute and the calculated probability change.

6. The method of claim 5, wherein receiving the user input signal comprises:
receiving the data set, a time range for the data set, an input data attribute to include in the set of input data attributes, or a combination thereof.

7. The method of claim 5, wherein determining the set of input data attributes corresponding to the user-selected resulting data attribute for analysis comprises:
selecting, from a plurality of sets of input data attributes, the set of input data attributes with a greatest positive probability change value or a greatest negative probability change value.

8. The method of claim 7, wherein receiving the user input signal comprises:
receiving an indication to select the set of input data attributes with the greatest positive probability change value or the greatest negative probability change value.

9. The method of claim 5, wherein the set of input data attributes comprises an indication of a specific sequence for the set of input data attributes.

10. The method of claim 5, wherein a data attribute of a data object of the plurality of data objects comprises a parameter corresponding to a web browser activity of a user, a user device, or a combination thereof.

11. The method of claim 5, further comprising:
modifying the displayed set of input data attributes and the calculated probability change based at least in part on receiving, in the user interface, a second user input signal comprising a second user-selected resulting data attribute, a second data set, a time range for the second data set, a second input data attribute, or a combination thereof.

12. An apparatus for displaying a subset of data attribute pattern groups corresponding to a user-selected persona type in a user interface, comprising:
a processor,
memory in electronic communication with the processor; and
instructions stored in the memory and executable by the processor to cause the apparatus to:
receive a set of data attribute patterns associated with user data for a data set comprising a plurality of data objects, wherein the set of data attribute patterns are determined based at least in part on a frequent pattern (FP) analysis of the data set, and wherein the FP analysis comprises:
constructing a condensed data structure that includes an FP tree and a linked list based at least in part on making two passes through the data set, the FP tree comprising a plurality of nodes corresponding to data attributes in the data set, the linked list comprising a plurality of entries that point to nodes of the FP tree;
receive, in the user interface, a user input signal comprising the user-selected persona type, wherein the user-selected persona type comprises one or more data attributes that define a characterization of a user;
receive, in the user interface, a frequency value for a frequency threshold and a recentness value for a recentness threshold, the recentness threshold comprising a time period associated with the set of data attribute patterns;
cluster the set of data attribute patterns into a set of data attribute pattern groups based at least in part on the frequency threshold and the recentness threshold from the user input signal and a number of data objects of the plurality of data objects common between data attribute patterns of the data attribute pattern groups;
determine the subset of data attribute pattern groups from the set of data attribute pattern groups for display based at least in part on the user-selected persona type from the user input signal, a level of data object coverage of the subset of data attribute pattern groups, and a level of data attribute coverage of the subset of data attribute pattern groups; and
display, in the user interface, the determined subset of data attribute pattern groups corresponding to the user-selected persona type from the user input signal.

13. The apparatus of claim 12, wherein the instructions to receive the user input signal are further executable by the processor to cause the apparatus to:
receive a data attribute of interest; and wherein the instructions to determine the subset of data attribute pattern groups are further executable by the processor to cause the apparatus to:
determine the subset of data attribute pattern groups based at least in part on the user input signal, wherein each data attribute pattern group of the subset of data attribute pattern groups is associated with the data attribute of interest.

14. The apparatus of claim 12, wherein the instructions to determine the subset of data attribute pattern groups further are executable by the processor to cause the apparatus to:

construct the subset of data attribute pattern groups according to a Kullback-Leibler (KL) Divergence Algorithm.

15. An apparatus for displaying a set of input data attributes corresponding to a user-selected resulting data attribute in a user interface, comprising:
- a processor:
- memory in electronic communication with the processor; and
- instructions stored in the memory and executable by the processor to cause the apparatus to:
  - receive a set of data attribute patterns for a data set comprising a plurality of data objects, wherein the set of data attribute patterns are determined based at least in part on a frequent pattern (FP) analysis of the data set, and wherein the FP analysis comprises:
    - constructing a condensed data structure that includes an FP tree and a linked list based at least in part on making two passes through the data set, the FP tree comprising a plurality of nodes corresponding to data attributes in the data set, the linked list comprising a plurality of entries that point to nodes of the FP tree;
  - receive, in the user interface, a user input signal comprising the user-selected resulting data attribute for analysis and a set of parameters for displaying the set of input data attributes corresponding to the user-selected resulting data attribute;
  - determine, based at least in part on the set of data attribute patterns and the user-selected resulting data attribute from the user input signal, the set of input data attributes corresponding to the user-selected resulting data attribute for analysis;
  - calculate a probability change corresponding to a difference between a probability that the user-selected resulting data attribute from the user input signal is in a data attribute pattern comprising the set of input data attributes and a probability that the user-selected resulting data attribute from the user input signal is in a data attribute pattern not comprising the set of input data attributes; and
  - display, in the user interface and based at least in part on the set of parameters from the user input signal, a sequence of the determined set of input data attributes corresponding to the user-selected resulting data attribute and the calculated probability change.

16. The apparatus of claim 15, wherein the instructions to receive the user input signal are further executable by the processor to cause the apparatus to:
- receive the data set, a time range for the data set, an input data attribute to include in the set of input data attributes, or a combination thereof.

17. The apparatus of claim 15, wherein the instructions to determine the set of input data attributes corresponding to the user-selected resulting data attribute for analysis are executable by the processor to cause the apparatus to:
- select, from a plurality of sets of input data attributes, the set of input data attributes with a greatest positive probability change value or a greatest negative probability change value.

18. The apparatus of claim 17, wherein the instructions to receive the user input signal are further executable by the processor to cause the apparatus to:
- receive an indication to select the set of input data attributes with the greatest positive probability change value or the greatest negative probability change value.

19. The apparatus of claim 15, wherein the set of input data attributes comprises an indication of a specific sequence for the set of input data attributes.

20. The apparatus of claim 15, wherein a data attribute of a data object of the plurality of data objects comprises a parameter corresponding to a web browser activity of a user, a user device, or a combination thereof.

* * * * *